United States Patent
Ogata et al.

(10) Patent No.: US 6,885,364 B1
(45) Date of Patent: Apr. 26, 2005

(54) CONTROL APPARATUS AND OUTPUTTING SIGNAL ADJUSTING METHOD THEREFOR

(75) Inventors: Hiroki Ogata, Chiba (JP); Kazusato Tagawa, Chiba (JP); Hiroyuki Nakazawa, Chiba (JP); Youtaro Sakakura, Fukushima (JP); Koji Mita, Fukushima (JP)

(73) Assignee: Sony Computer Entertainment Inc. (JP)

( * ) Notice: Subject to any disclaimer, the term of this patent is extended or adjusted under 35 U.S.C. 154(b) by 95 days.

(21) Appl. No.: 09/658,618

(22) Filed: Sep. 8, 2000

(30) Foreign Application Priority Data

Sep. 11, 1999 (JP) ............................................ 11-297205

(51) Int. Cl.[7] .............................. G09G 5/08; G09G 5/00
(52) U.S. Cl. ........................ 345/161; 345/156; 345/701
(58) Field of Search ................................ 345/700–702, 345/156, 158, 161, 163, 169, 167, 173

(56) References Cited

U.S. PATENT DOCUMENTS

| | | | |
|---|---|---|---|
| 5,049,079 A | | 9/1991 | Furtado et al. ............. 434/253 |
| 5,409,239 A | * | 4/1995 | Tremmel ..................... 463/37 |
| 5,485,171 A | * | 1/1996 | Copper et al. .............. 345/160 |
| 5,714,981 A | | 2/1998 | Scott-Jackson et al. ..... 345/161 |
| 5,786,808 A | * | 7/1998 | Khoury ...................... 345/161 |
| 5,923,317 A | | 7/1999 | Sayler et al. ............... 345/156 |
| 6,102,802 A | * | 8/2000 | Armstrong ................... 463/37 |
| 6,135,886 A | * | 10/2000 | Armstrong ................... 463/37 |
| 6,208,271 B1 | * | 3/2001 | Armstrong ................... 341/34 |
| 6,469,691 B1 | * | 10/2002 | Armstrong .................. 345/159 |
| 6,470,078 B1 | * | 10/2002 | Armstrong ............... 379/93.19 |

FOREIGN PATENT DOCUMENTS

| | | |
|---|---|---|
| EP | 0 768 619 A1 | 4/1997 |
| EP | 0 785 499 A1 | 7/1997 |
| JP | 3-101475 U | 10/1991 |
| JP | 4-38139 U | 3/1992 |
| JP | 05-007154 A | 1/1993 |
| JP | 06-044861 A | 2/1994 |
| JP | 3040155 U | 5/1997 |
| TW | 288636 | 10/1996 |

OTHER PUBLICATIONS

"Pressure Sensitive Mouse", IBM Technical Disclosure Bulletin, Vd. 35, No. 6, Nov. 1, 1992, pp. 288–289.

* cited by examiner

Primary Examiner—Alecia D. Nelson
(74) Attorney, Agent, or Firm—Lerner, David, Littenberg, Krumholz & Mentlik, LLP

(57) ABSTRACT

An analog operation is possible by a pressing operation of a controller which is normally used for conventional digital operation. A detecting device (e.g., a pressure-sensitive device) for outputting an analog signal corresponding to the pressing operation by the controller is provided, the analog signal which is outputted by the detecting device is segmented into levels by a level segmenting unit, and the segmented analog signal is converted into a digital signal having a plurality of bits corresponding to the output level by an A/D converting unit. A segmenting-range setting unit (such as a memory) for setting the range of output levels of the analog signal which is segmented by the level segmenting unit is also provided. The level segmenting unit segments the output level of the analog signal which is outputted by the detecting device within the range which is set by the segmenting-range setting unit.

18 Claims, 45 Drawing Sheets

(A)
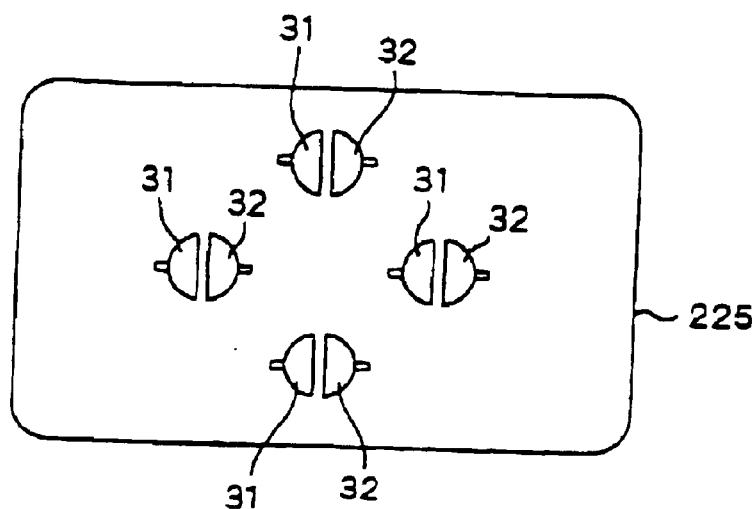
(B)
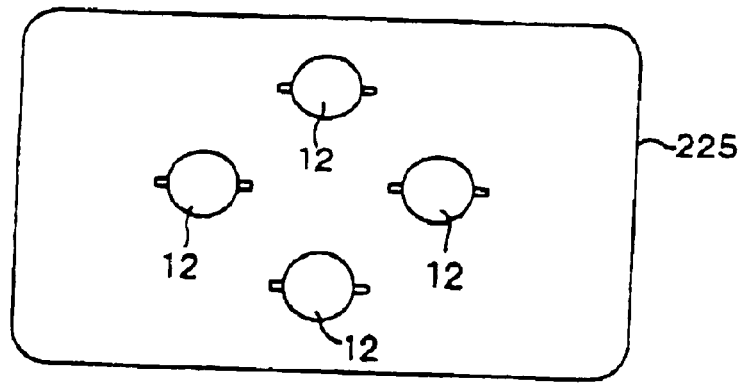
FIG. 31

CONTROL APPARATUS AND OUTPUTTING SIGNAL ADJUSTING METHOD THEREFOR

FIELD OF THE INVENTION

The present invention relates to a control apparatus (controller) which is used for peripheral equipment of entertainment devices such as video game machines.

BACKGROUND OF THE INVENTION

Generally, a variety of control operations of entertainment devices such as video game machines are performed by using control apparatuses. Therefore, a plurality of control buttons are provided on the control apparatuses and the user controls those buttons, thereby controlling the entertainment devices. As an example, the user can control a character which is displayed on a television receiver.

Conventionally, according to the thus-constructed control apparatuses, in many cases, cross-shaped or circular directional control buttons having are disposed at the front-left thereof and a plurality of multi-purpose buttons are disposed at the front-right thereof.

The directional control buttons and the multipurpose buttons comprise a tactile switch or rubber switch. Since the switch is tuned on/off, the character id moved in a digital manner or the state of the character is changed in a digital manner.

As explained above, the conventional entertainment device has only a function for digitally changing the character which is displayed on the television receiver by using the directional control buttons or the multi-purpose buttons, and thereby has a disadvantage in that the motion of the character and changes thereof are not gradual and the appearance thereof is poor.

In order to overcome this disadvantage, according to a manipulation device for a game machine disclosed in Japanese Patent Laid-Open (unexamined) No. 7-88252, it is possible to control a character which is displayed on a display screen of a television receiver in an analog manner by adding an analog-type input device which comprises a track ball or joystick etc. Japanese Patent Laid-Open (unexamined) No. 11-90042 discloses another conventional art to which an analog-type input device is added.

However, the analog-type input device which comprises the track ball or joystick, etc. is quite different from that of the above-described directional control buttons or multi-purpose buttons in view of the operability. Therefore, it is expected that it takes a long time for a user who is accustomed to using the directional control buttons or multi-purpose buttons to become practiced in the operation of the analog-type input device and that the amount of fun which the entertainment device inherently provides is cut by half.

SUMMARY OF THE INVENTION

In terms of the aforementioned case, it is an object of the present invention to enable operation in an analog manner by pressing operation of a controller of which is normally used for conventional digital operation.

In order to attain the object, according to the present invention, there is provided a control apparatus including a controller which can be pressed and operated, a detecting device for outputting an analog signal corresponding to the pressing operation of the controller, a level segmenting unit for segmenting an output level of the analog signal which is outputted from the detecting device in accordance with the pressing operation of the controller into a plurality of levels, an A/D converting unit for converting the analog signal into a digital signal in accordance with the output levels which are segmented by the level segmenting unit, and a segmenting-range setting unit for setting a range of the output levels of the analog signal which is segmented by the level segmenting unit, wherein the plurality of levels into which the analog signal outputted by the detecting device is segmented by the level segmenting unit are within the range which is set by the segmenting range-setting unit.

According to the construction of the present invention, the analog signal corresponding to the pressing control operation of the controller is converted into the digital signal and outputted, thereby realizing a digital control operation by the pressing operation of the controller.

The individual differences of the detecting device and variations in voltage which is applied to the detecting device cause variations in the output levels of the analog signals which are outputted by the detecting device in accordance with the pressing operation of the controller depending on the control apparatus.

Then, according to the present invention, the control apparatus includes the segmenting-range setting unit for setting a range of the output levels of the analog signal which is segmented by the level segmenting units wherein the plurality of levels into which the analog signal outputted by the detecting device is segmented by the level segmenting unit are within the range which is set by the segmenting-range setting unit.

Accordingly, it is possible to output a digital signal having a plurality of bits which is obtained by uniformly segmenting the levels without influences of the individual differences of the detecting device and variations in voltage which is applied to the detecting device.

For instance, the segmenting range setting unit can include a storing unit and the level segmenting unit can segment the output level of the analog signal which is outputted by the detecting device into a plurality of levels within the output level range of the analog signal which is stored in the storing unit. According this constitution, as an example, the controller is pressed and controlled by pressure which is preset and the output level of the analog signal which is outputted by the detecting device is stored in the storing unit, and thereby the output of the digital signal having a plurality of bits which is obtained by uniformly segmenting the level corresponding to the pressure can be obtained.

A switch for switching the output from the A/D converting unit can select the output having a single bit or a plurality of bits and can obtain the selected output.

The segmenting-range setting unit may include a volume device that is inserted in a power line to which the detecting device is connected. The level segmenting unit may segment the range of the output levels of the analog signal outputted by the detecting device into a plurality of levels within a range of output levels which is detected by the volume device (electric-potential setting device). For example, the combination of a fixed resistance and a variable resistance and a variable resistance, etc. can be applied to the volume device.

As mentioned above, it is possible to set the range of the output levels of the analog signal which is segmented by the level segmenting unit and to segment the levels more properly corresponding to the state of the voltage which is applied to the detecting device by using the volume device that is inserted in the power line to which the detecting device is connected.

According to the above-constituted control apparatus in the case of monitoring the output level detected by the volume device which is inserted in the power line to which the detecting device is connected and of changing the output level, if, after change, a method of segmenting the output level of the analog signal which is outputted by the detecting device into a plurality of levels within the range of the output level which is detected by the volume device is adopted, it is possible to properly correct the range of output levels of the analog-signal which is segmented by the level segmenting unit if the voltage state of the power line is changed by the secular change.

Further, the segmenting-range setting unit may include a volume device that is inserted in the power line to which the detecting device is connected, a storing unit for storing a limit value of a range of the output levels of the analog signal which is segmented by the level segmenting unit, and a comparator for comparing the range of the output levels which is detected by the volume device with the limit value which is stored in the storing unit. When it is determined by the comparator that the range of the output levels which is detected by the volume device is within the range of the limit value which is stored in the storing unit, the range of the output levels may be outputted to the level segmenting unit. When it is determined by the comparator that the range of the output levels which is detected by the volume device is above the limit value which is stored in the storing unit, the limit value may be outputted to the level segmenting unit.

According to a control apparatus which is connected an entertainment device having an executing function of a program, the entertainment device outputs control guide on the basis of a predetermined adjusting program, the controller is pressed in accordance with the control guide. Thereby, the entertainment device also stores the output level of the analog signal which is outputted by the detecting device in the storing unit, that is built therein or is connected thereto. Based on the output level which is stored in the storing unit, the level segmenting unit can also output the digital signal obtained by the uniform level-segment, by a signal output adjusting method of segmenting an analog signal which is outputted by the detecting device into a plurality of levels.

In this case, it is sufficient to store the output level of the analog signal which is outputted by the detecting device by the pressing operation of the controller in accordance with the control guide in a memory card which is detachably connected to the entertainment device as the storing unit.

The controller may have various shapes and structures. By forming a projection at the bottom of the controller or forming a plane bottom thereof, this results in improving the sensitivity and the durability.

The number of parts can be decreased by directly providing the detecting device on an internal board.

Further, the controller is provided with a digital switch and a digital signal generating unit, thereby enabling the digital signal having a single bit and the digital signal having a plurality of bits to be outputted selectively. The digital switch can be constructed by various combination of the detecting device on the structure.

BRIEF DESCRIPTION OF THE DRAWINGS

FIG. 31A and FIG. 31B are diagrams for explaining a third structural example of the second control unit according to the second embodiment, in which FIG. 31A is a plan view thereof and FIG. 31B is a bottom view thereof;

DESCRIPTION OF THE PREFERRED EMBODIMENTS

Embodiments according to the present invention will be described in detail hereinbelow with reference to the drawings.

A control apparatus according to the present embodiments is connected to a video game machine as an entertainment device, and can control a character which is displayed on a display screen of a television receiver in a digital/analog manner.

[Outline of the device]

Figure 1:
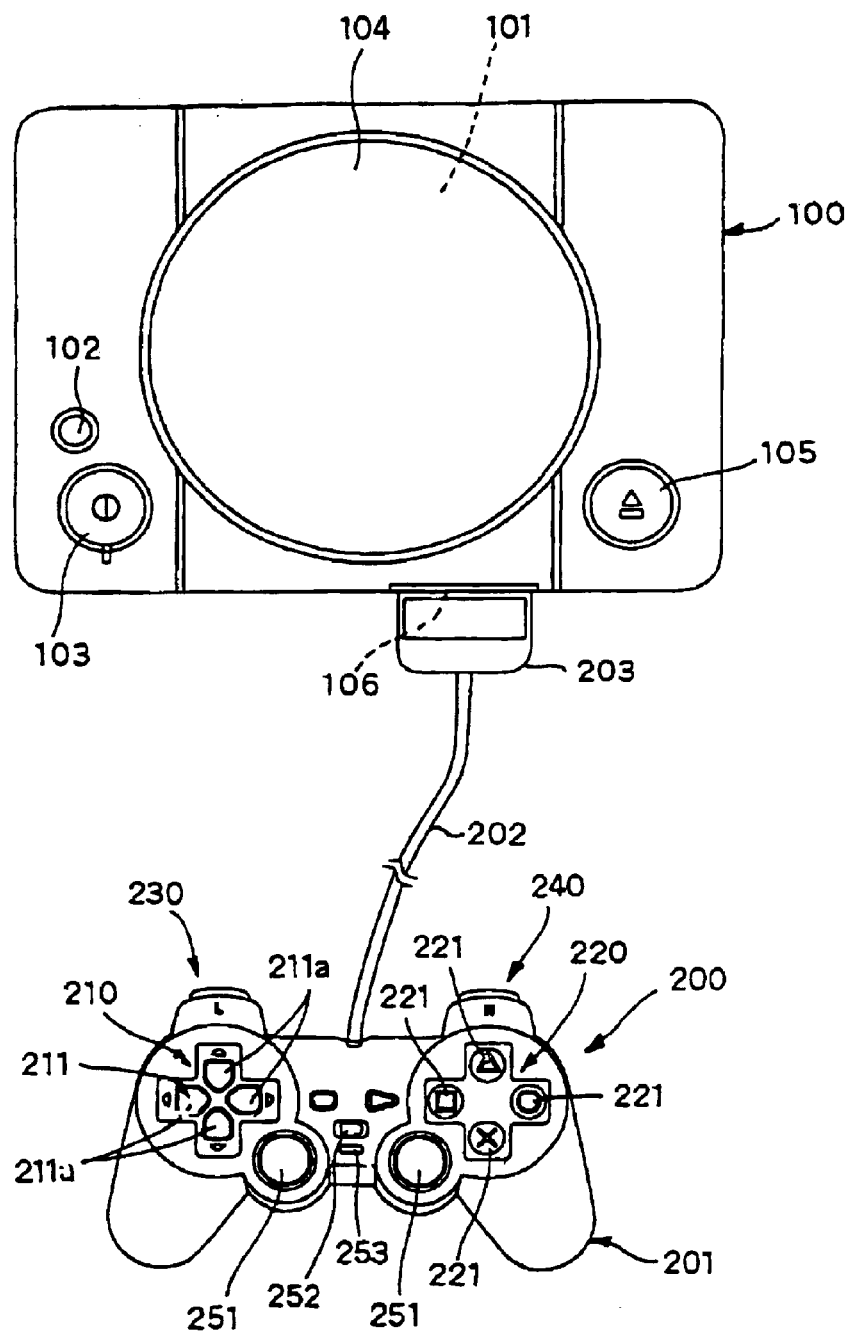
FIG. 1 is a plan view showing the outline of a video game machine which is used with a control apparatus according to embodiments of the present invention.

FIG. 1 is a plan view showing the outline of the video game machine with which the control apparatus according to the present embodiments is used. As shown in the figure, the video game machine includes a game machine main body 100 which is connected to a television receiver (not shown) which is used as a display and a control apparatus 200 which is connected to the game machine main body 100.

The game machine main body 100 is provided therein with a disk drive unit 101 for reading an optical disk on which a game program is recorded, an image processing device for displaying characters and a background picture on the screen of the television receiver in accordance with the game program which is stored in the optical disk, and the like. The game machine main body 100 is also provided therein with a reset switch 102 for resetting the game during execution, a power switch 103, and a casing opening control button 105 for controlling an operation for opening/closing a casing 104 which opens/closes a disk loading unit of the disk/drive unit 101.

The control apparatus 200 is connected to the game machine main body 100 via a connecting cord 202 which is led out from a device main body 201. A connector 203 is provided at one end of the connecting cord 202. The connector 203 is connected to a jack 106 which is provided in one side of the game machine main body 100, thereby connecting the control apparatus 200 to the game machine main body 100.

Figure 2:
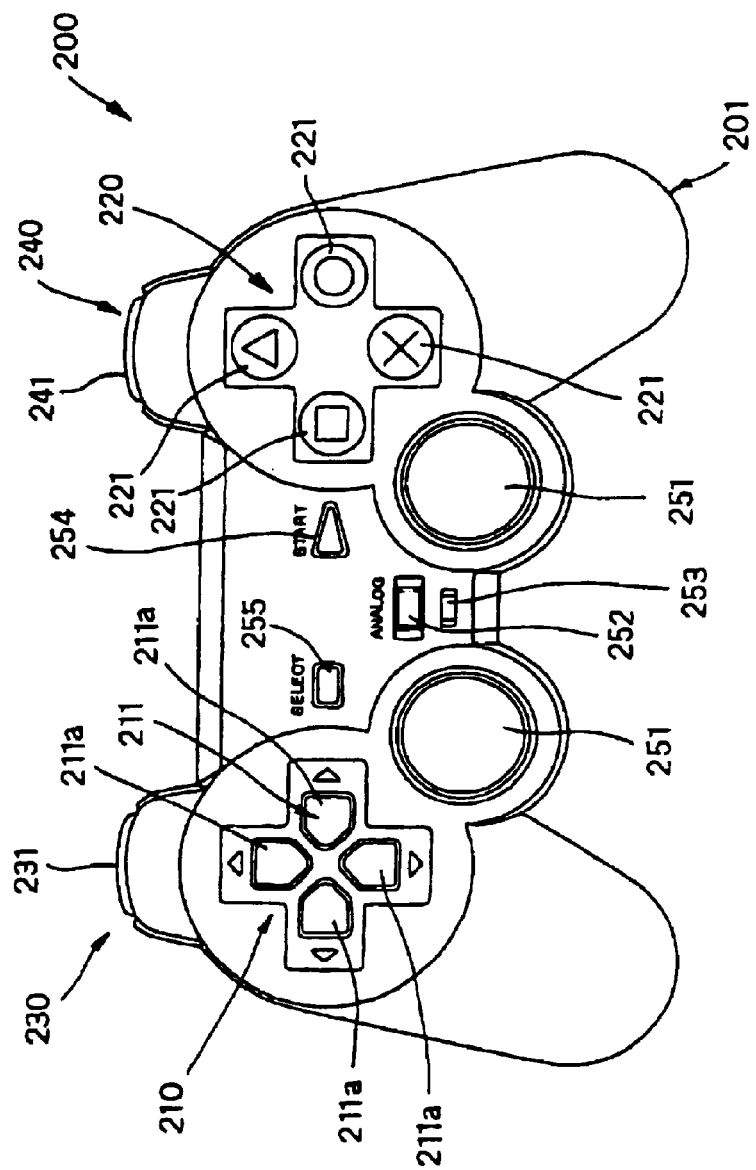
FIG. 2 is an enlarged plan view showing the control apparatus shown in FIG. 1.

FIG. 2 is a plan view showing the control apparatus. A first control unit 210 and a second control unit 220 are provided on the upper side of the device main body 201 of the control apparatus 200, and a third control unit 230 and a fourth control unit 240 are provided on the lateral side thereof.

The first control unit 210 comprises one cross-shaped control body 211 for pressing control operation, and control keys 211a which extend in four directions form the control body 211. The first control unit 210 causes a character displayed on the screen of the television receiver to be moved and has a function for moving the character vertically and horizontally by pressing the control keys 211a in the control body 211.

The second control unit 220 comprises four columnar-shaped control buttons (controller) 221 for pressing control operation. Identification marks such as a circle "o", triangle "Δ", square, "□" and cross "×" are provided on the control buttons 221, so that it is easy to identify the individual control buttons 221. The function of the second control unit 220 is determined by the game program which is recorded in the optical disk. A function for changing the state of a game character is assigned to the control buttons 221. For example, functions for moving the right and left arms and the right and left legs are assigned.

The third and fourth control units 230 and 240 have almost the same structure, and comprise two control buttons 231 (controller) and two control buttons (controller) 241, respectively. The functions of the third and fourth control units 230 and 240 are determined by the game program which is recorded in the optical disk, for example, functions for performing special movements of the game character are assigned.

Further, joysticks 251 for analog operation are provided in the device main body 201 shown in FIG. 2. The joysticks 251 switch the first and second control units 210 and 220, thereby making the device more usable. The switching operation is performed by an analog-selecting switch 252 which is provided in the device main body 201. When the joysticks 251 are selected, a display unit 253 which is provided in the device main body 201 is lit, thereby indicating that the joysticks 251 are selected.

Incidentally, the device main body 201 also has a start switch 254 for instructing starting of the game and a select switch 255 for selecting the degree of difficulty of the game when starting the game.

[First embodiment]

The following is a next detailed description of the structure of a first embodiment of the present invention.

Figure 3:
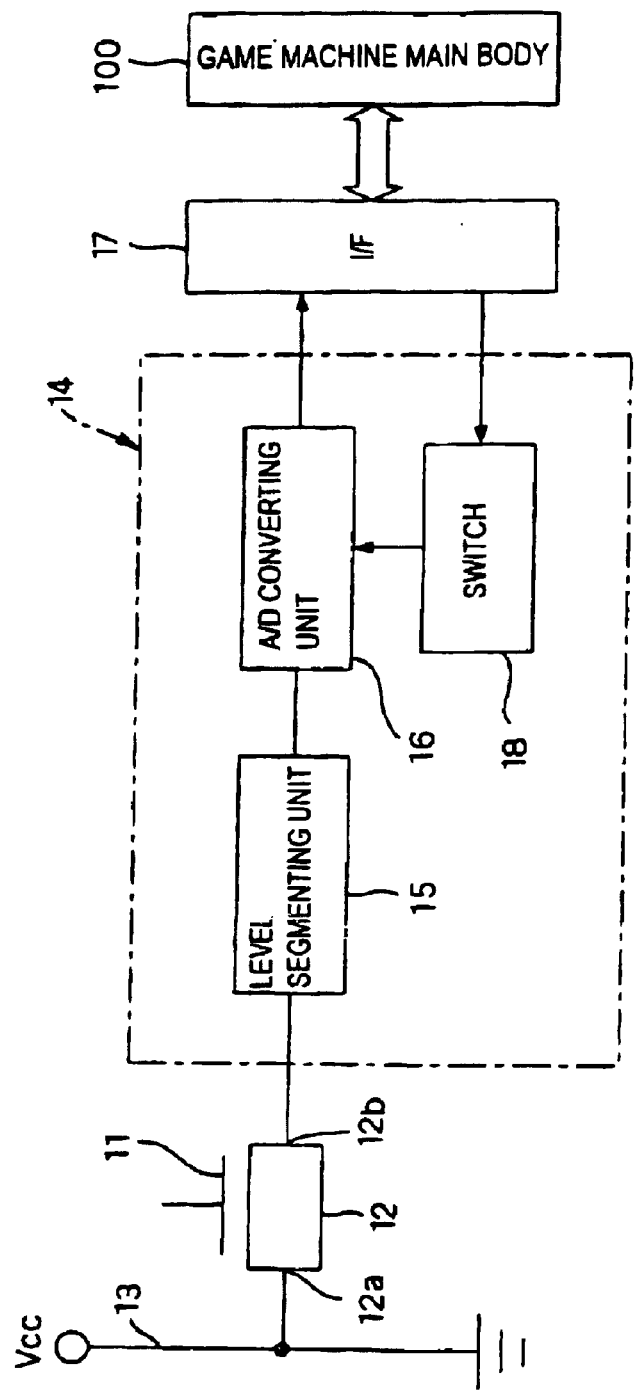
FIG. 3 is a block diagram showing the main portion of a control apparatus according to a first embodiment of the present invention.

FIG. 3 is a block diagram showing the main portion of a control apparatus according to the first embodiment of the sent invention.

The control units 210, 220, 230, and 240 for pressing control operation in the control apparatus 200 have a controller 11 comprising the control keys 211a of the control body 211 and the control buttons 221, 231, and 241, and a pressure-sensitive device (detecting device) 12.

The pressure-sensitive device 12 is made of pressure-sensitive conductive rubber, and electrodes 12a and 12b are formed at two ends thereof which are positioned symmetrically. One electrode 12a is connected to a power line 13 and a predetermined voltage is applied thereto from a power source (Vcc). The resistance between the electrodes 12a and 12b changes in accordance with the magnitude of a pressure which acts on the pressure-sensitive device 12.

Figure 4:
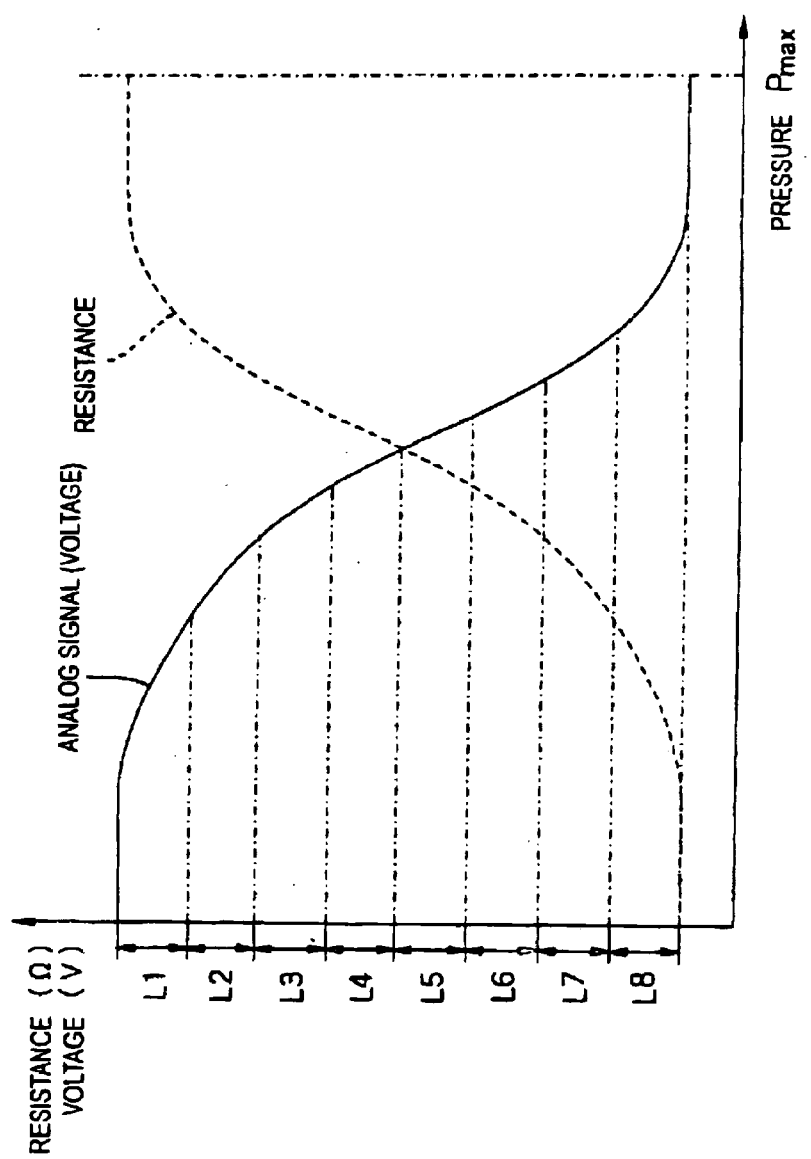
FIG. 4 is a diagram showing characteristics of a pressure-sensitive device shown in FIG. 3.

As one example, the pressure-sensitive device 12 made of pressure-sensitive conductive rubber exhibits the smallest resistance when no pressure acts, and the resistance increases as the applied pressure becomes larger, as shown by a dotted line in FIG. 4. Therefore, the largest analog signal (voltage) is outputted at the other electrode 12b when no pressure acts, and the analog signal (voltage) which is outputted decreases as the pressure increase (solid line in FIG. 4).

The pressure-sensitive device 12 is disposed in the path/line into which the controller 11 is pushed. As the user presses the controller 11, pressure is applied and the resistance of the pressure-sensitive device 12 changes. The analog signal corresponding to the pressure is outputted at the electrode 12b side.

A microprocessor unit 14 (abbreviated to MPU, hereinafter) for controlling the control apparatus 200 is mounted on an internal board of the control apparatus 200. The MPU 14 functions as a level segmenting unit (LS) 15 for segmenting the output level of the analog signal which is outputted by the press-sensitive device 12 into a plurality of levels, an A/D converting unit 16 for converting the analog signal which is outputted from the pressure-sensitive device 12 into a digital signal in accordance with the output level which is segment by the level segmenting unit 15, and a switch 18 which will be explained hereinafter. The electrode 12b of the pressure-sensitive device 12 is connected to an input side of the level segmenting unit 15.

The level segmenting unit 15 has a fundamental function for segmenting the range of a preset analog signal level (voltage) by a uniform width, as shown in FIG. 4. The number of segments can be set arbitrarily, and the example shown in FIG. 4 illustrates that the range of analog signal level (voltage) is uniformly segmented into eight levels. Individual output levels L1 to L8 which are thus uniformly segmented are transmitted to the A/D converting unit 16. Incidentally, the range of the analog signal level which is uniformly segmented by the level segmenting unit 15 can be arbitrarily changed.

The A/D converting unit 16 converts the analog signal which is segmented into levels by the level segmenting unit 15 into a digital signal in accordance with the output level of the analog signal and outputs the digital signal. That is, digital signals having a plurality of bits are outputted by the A/D converting unit 16 in accordance with the output level L1 to L8.

Herein, a description will be given of a specific example of the level segmenting unit 15 and the A/D converting unit 16. If it is assumed that the control apparatus 200 is driven by a power supply voltage of 3.5 V, the analog signal which is outputted by the pressure-sensitive device 12 changes from 0 to 2.4 V. If it is also assumed that the level segment unit 15 uniformly segments the output level ranging from 0 to 2.4 V into eight levels, one level has a level width of 0.3 V.

Therefore, the level segmenting unit 15 segments the output levels of 2.4 to 2.1 V, 2.1 to 1.8 V, 1.8 to 1.5 V, 1.5 to 1.2 V, 1.2 to 0.9 V, 0.9 to 0.6 V, 0.6 to 0.3 V, and 0.3 to 0 V of the analog signal which is outputted by the pressure-sensitive device 12 into level 1 (L1), level 2 (L2), level 3 (L3), level 4 (L4), level 5 (L5), level 6 (L6), level 7 (L7), and level 8 (L8), respectively.

The A/D converting unit 16 assigns proper digital signals having a plurality of bits to the output levels which are level-segmented as disclosed above and outputs the digital signals. For instance, digital signals having a plurality of bits, e.g., 8 bits or 16 bits, are assigned to the output levels, and digital signals of "1f", "3f", . . . , "ff" (hexadecimal notation) are assigned to level 1, level 2, . . . , level 8, respectively, and are outputted.

The digital signal which has a plurality of bits and is outputted by the A/D converting unit 16 is transmitted to the game machine main body 100 via an interface 17 which is provided in the internal board of the control apparatus 200, so that the digital signal causes the game character to be moved, etc.

The change in level of the analog signal outputted by the pressure-sensitive device 12 corresponds to the change in pressure applied by the controller 11 applied, as mentioned above. Accordingly, the digital signal which has a plurality of bits and is outputted by the A/D converting unit 16 corresponds to the pressure on the controller 11 by the user. If the operations for the game character, etc. are controlled in response to the digital signal having a plurality of bits which is related to the user's pressing operation, it is possible to realize a smoother operation in an analog manner, as compared with the ON/OFF control operation in response to a single-bit digital signal which is "1" or "0".

According to the present embodiment, the A/D converting unit 16 also functions as an output unit which outputs a single-bit digital signal having a single bit (i.e., "1" or "0") in accordance with the change in analog signal outputted by the pressure-sensitive device 12 and in response to the switching operation of the switch 18. Either the digital signal having a plurality of bits or the digital signal having a single bit is outputted by the A/D converting unit 16.

According to the present embodiment, the switch 18 is controlled in response to a control signal which is sent from the game machine main body 100 on the basis of the game program recorded in the optical disk. That is, if the game program which is recorded in the optical disk is executed, the game machine main body 100 outputs the control signal for inducting the A/D converting unit 16 to function as an output unit for digital signal having a plurality of bits or outputs the control signal for instructing the A/D converting unit 16 to function as an output unit for the digital signal having a single bit in accordance with the contents of the game program. Based on the control signal, the switch 18 selects and switches the function of the A/D converting unit 16.

According to the function which is selected by the switch 18, the A/D converting unit 16 converts the analog signal outputted by the pressure-sensitive device 12 into the digital signal having a plurality of bits or the digital signal having a single bit and outputs the converted digital signal. If the function as the output unit for the digital signal having a plurality of bits is selected, the output level which is uniformly segmented by the level segmenting unit 15 as mentioned above is converted into the corresponding digital signal and is outputted to the game machine main body 100. On the other hand, if the function as the output unit for the digital signal having a single bit is selected, the digital signal having a single bit "1" or "0" is outputted to the game machine main body 100 in accordance with the change in the analog signal outputted by the pressure-sensitive device 12.

The switch 18 may be switched by the users manual operation. For instance, a function for switching the switch 18 is allocated to the analog-selecting switch 252 provided in the control apparatus 200 and the switch 18 is operated by the manual operation of the analog-selecting switch 252, thereby switching the function of the A/D converting unit 16.

Figure 5:
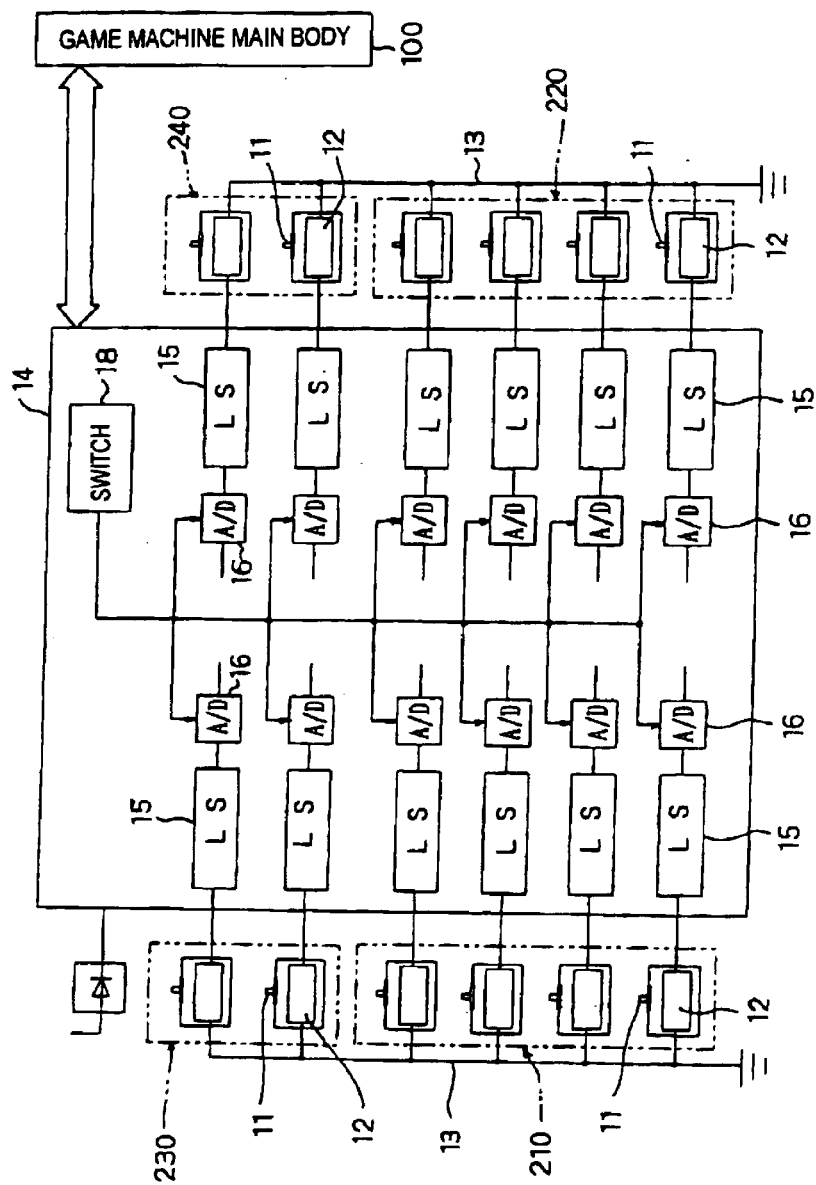
FIG. 5 is a block diagram showing an example of the entire configuration of the control apparatus according to the first embodiment of the present invention.

According to the present embodiment, as shown in FIG. 5, the first to fourth control units 210, 220, 230, and 240 have the configuration shown in FIG. 3. Thus, it is possible to separately use digital operation and the analog operation of the control units 210, 220, 230, and 240. Incidentally, only the control unit which is arbitrarily selected among the first to forth control units 210, 220, 230, and 240 can also have the configuration shown in FIG. 3.

As explained above, the level segmenting unit 15 uniformly segments the output level of the analog signal which is outputted by the pressure-sensitive device 12 within the preset range. However, if the preset range deviates from the range of the analog signal level (voltage) which is actually outputted by the pressure-sensitive device 12, there is a danger that it is impossible to output a digital signal which matches with the state of the controller 11.

Further, the pressure-sensitive devices 12 have individual difference and the power supply voltages also vary. This results in varying output ranges of the analog signals which are outputted by the pressure-sensitive devices 12 that are provided in the control units 210, 220, 230, and 240, depending on the individual control apparatuses 200.

According to the present embodiment, the control apparatus 200 comprises a calibration function (segmenting-range adjusting means) for individually setting the range of the output level of the analog signal which is segmented by the level segmenting unit 15.

Figure 6:
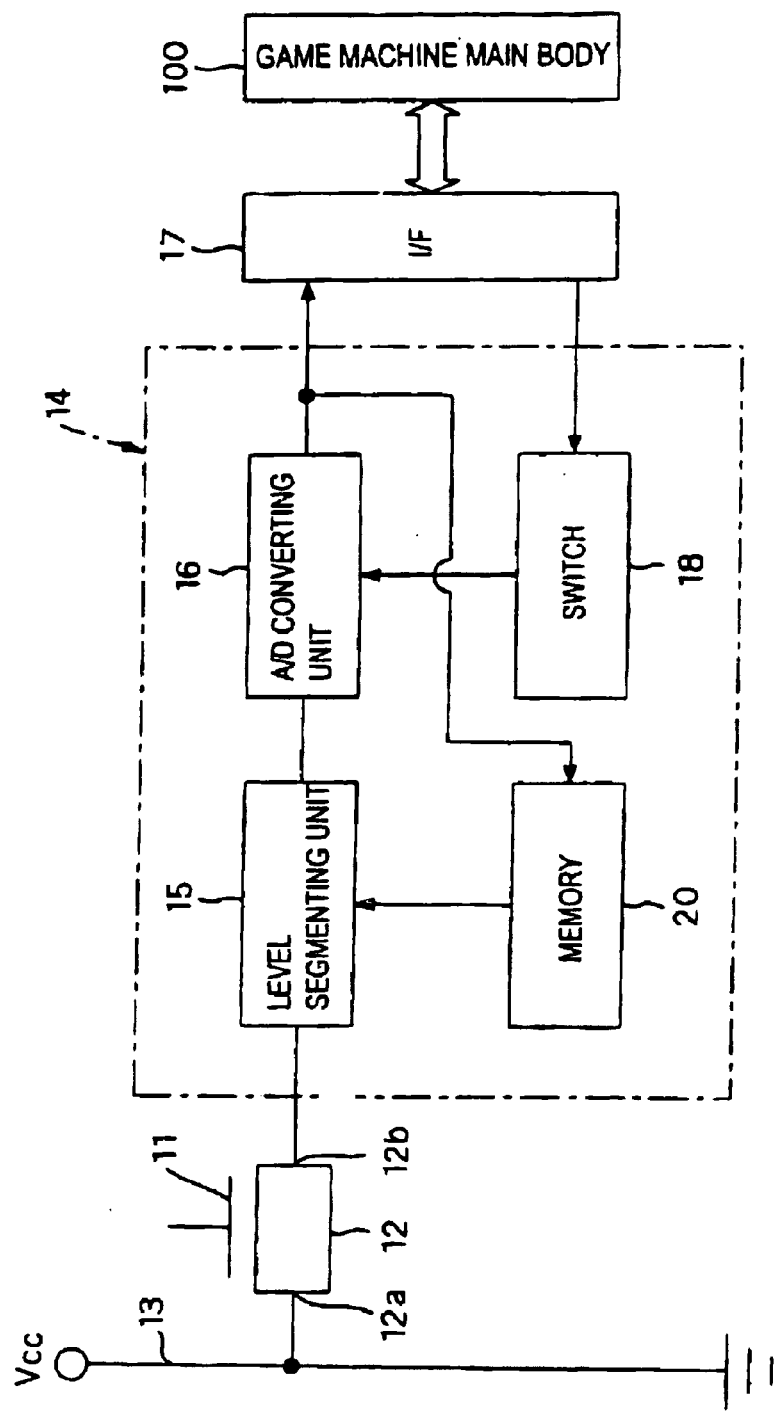
FIG. 6 is a block diagram showing a first structural example for calibration of a level segmenting unit.

FIG. 6 is a block diagram showing a first structural example for calibration of the level segmenting unit 15. According to the configuration shown in the figure, the MPU 14 includes a memory 20 and the range of the output levels of the analog signal which is segmented by the level segmenting unit 15 is stored in the memory 20.

As an example, in the production line of the control apparatus 200, a predetermined load is applied to the control apparatus 200 so that the resistance of the pressure-sensitive device 12 becomes a maximum. In this case, the output level of the analog signal which is outputted by the pressure-sensitive device 12 is stored in the memory 20.

Next, a description will be given based on the above-discussed specific example. Assuming that a default value of the level segmenting unit 15 is set so as to uniformly segment the voltage level ranging from 0 to 2.4 V into eight levels and an analog signal of 2.0 V is outputted by the pressure-sensitive device 12 when the predetermined load acts, the A/D converting unit 16 outputs the digital signal "3f" which corresponds to level 2, as explained above. The digital signal "3f" is stored in the memory 20, and the level segmenting unit 15 adjusts the output range of the analog signal which is level-segmented on the basis of the set value.

Incidentally, the digital signal "3f" corresponds to the output level of the analog signal of 2.1 V to 1.8 V. Preferably the voltage value within the range is specified in advance. For instance, it is specified in advance that a maximum voltage value (2.1 V in the foregoing example) of the output levels is the upper limit of the range of output levels of the analog signal which is segmented into the levels.

Figure 7:
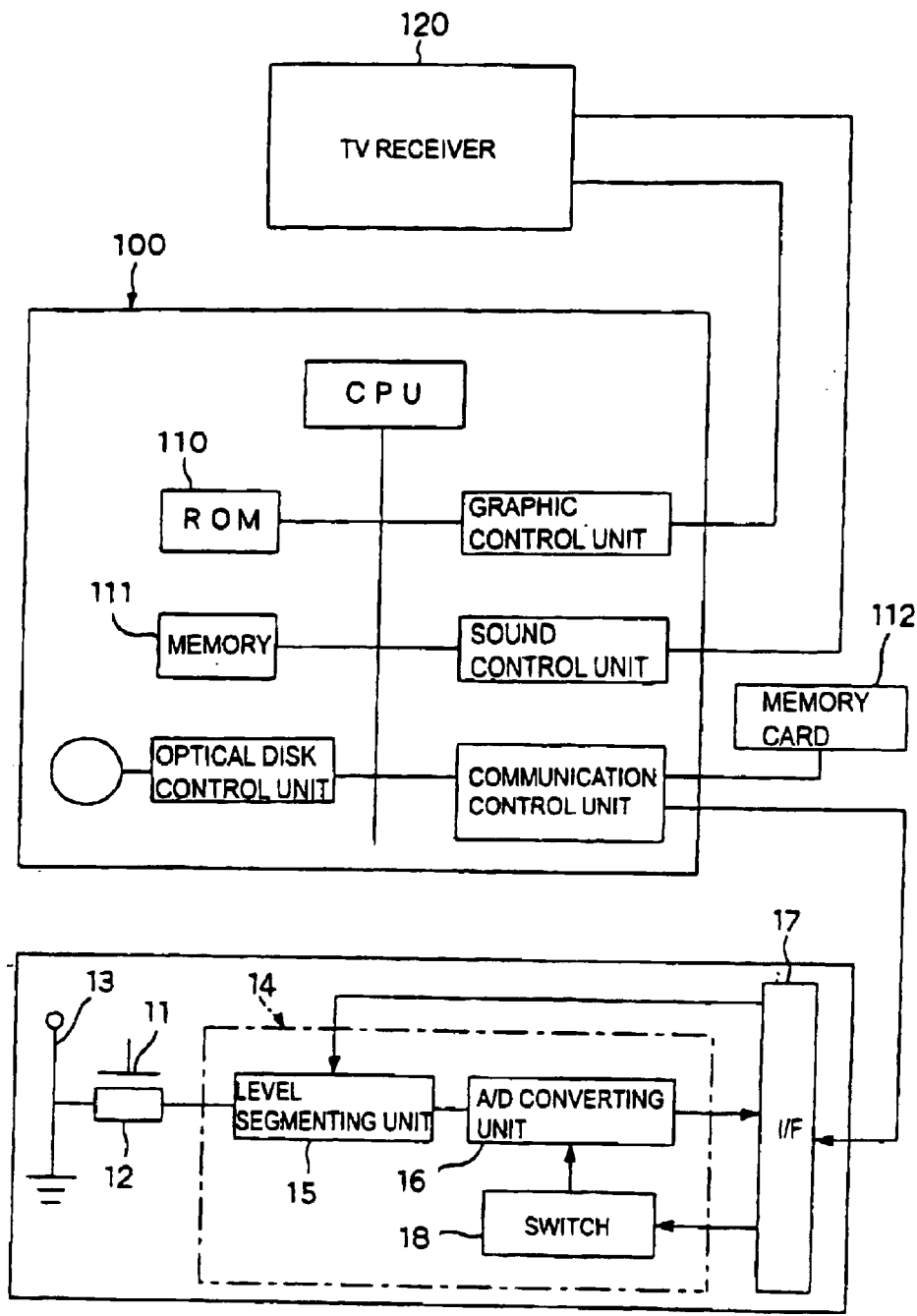
FIG. 7 is a block diagram showing a second structural example for calibration of the level segment unit.

FIG. 7 is a block diagram showing a second structural example for calibration of the level segmenting unit. According to the configuration shown in the figure, a memory is not provided in the control apparatus 200 and, in place thereof, the range of output levels of the analog signal which is segmented by the level segmenting unit 15 is stored in a built-in memory 111 of the game machine main body 100 to which the control apparatus 200 is connected or into a memory card 112 which is detachable.

When the calibration of the level segmenting unit 15 is executed by using this configuration, preferably, a setting program for executing the calibration operation is built in a control program which is stored in a ROM 110 in the game machine main body 100.

Figure 8:
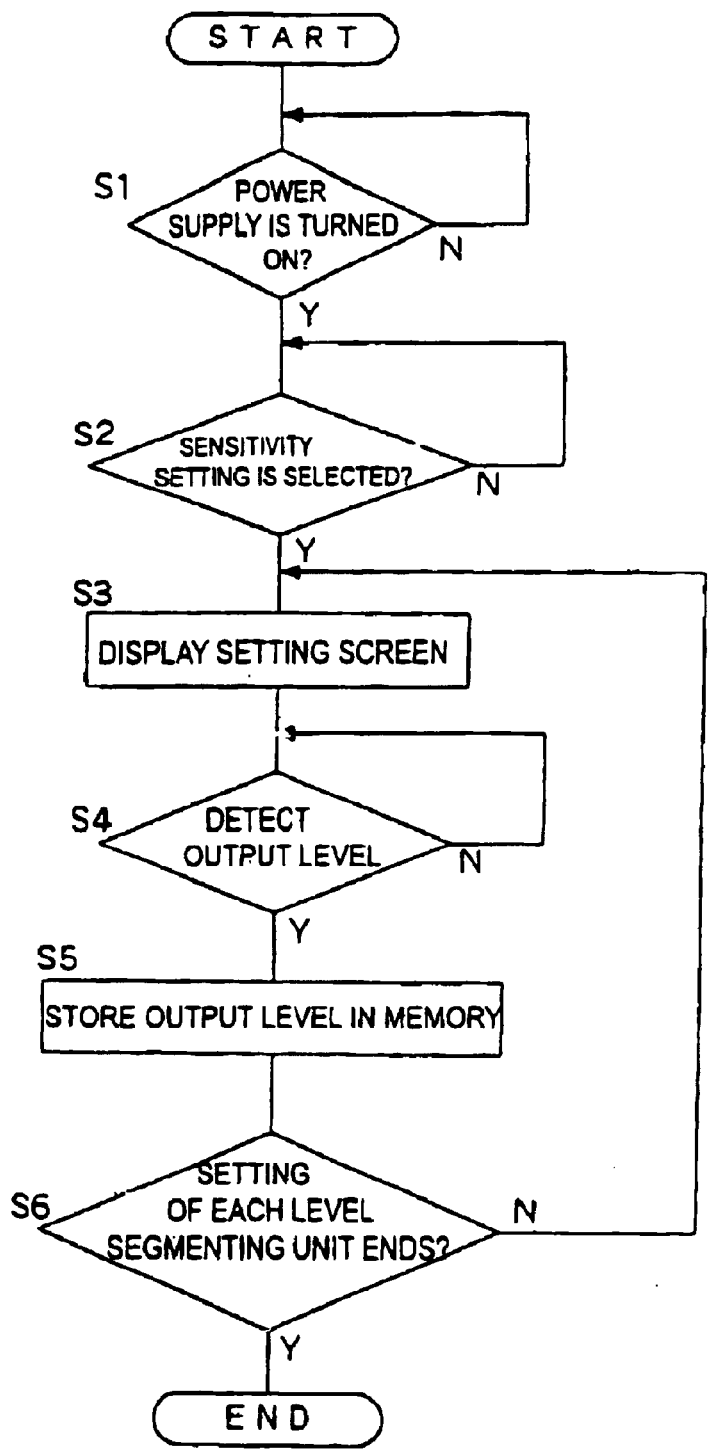
FIG. 8 is a flowchart showing one example of a setting program for calibration which is applied to the second structural example shown in FIG. 7.

FIG. 8 is a flowchart showing one example of the setting program.

First of all, a power supply of the game machine main body 100 is turned on (step S1). The sensitivity setting (calibration) of the control unit is selected by the menu selection by the user (step S2). Then, a setting screen is displayed on the television receiver 120 (step S3). For example, a message for prompting the user to strongly press the controller 11 which is provided in the predetermined control unit is displayed on the setting screen. When the use presses the controller 11 strongly according to the display, the output level of the analog signal from the pressure-sensitive device 12 which is detected in this case is outputted to the game machine main body 100 (step S4). The output level is stored in the built-in memory 111 (step S5). The above-mentioned steps are repeated for level segmenting unit 15 in the control apparatus 200 (step S6), and the sensitivity setting of the control unit ends.

The level segmenting unit 15 provided in the control apparatus 200 adjusts the range of output levels of the segmented analog-signal on the basis of the set value which is stored in the built-in memory 111 in the game machine main body 100.

It is also possible to provide the setting program for executing the calibration operation in the game program which is recorded in the optical disk.

Figure 9:
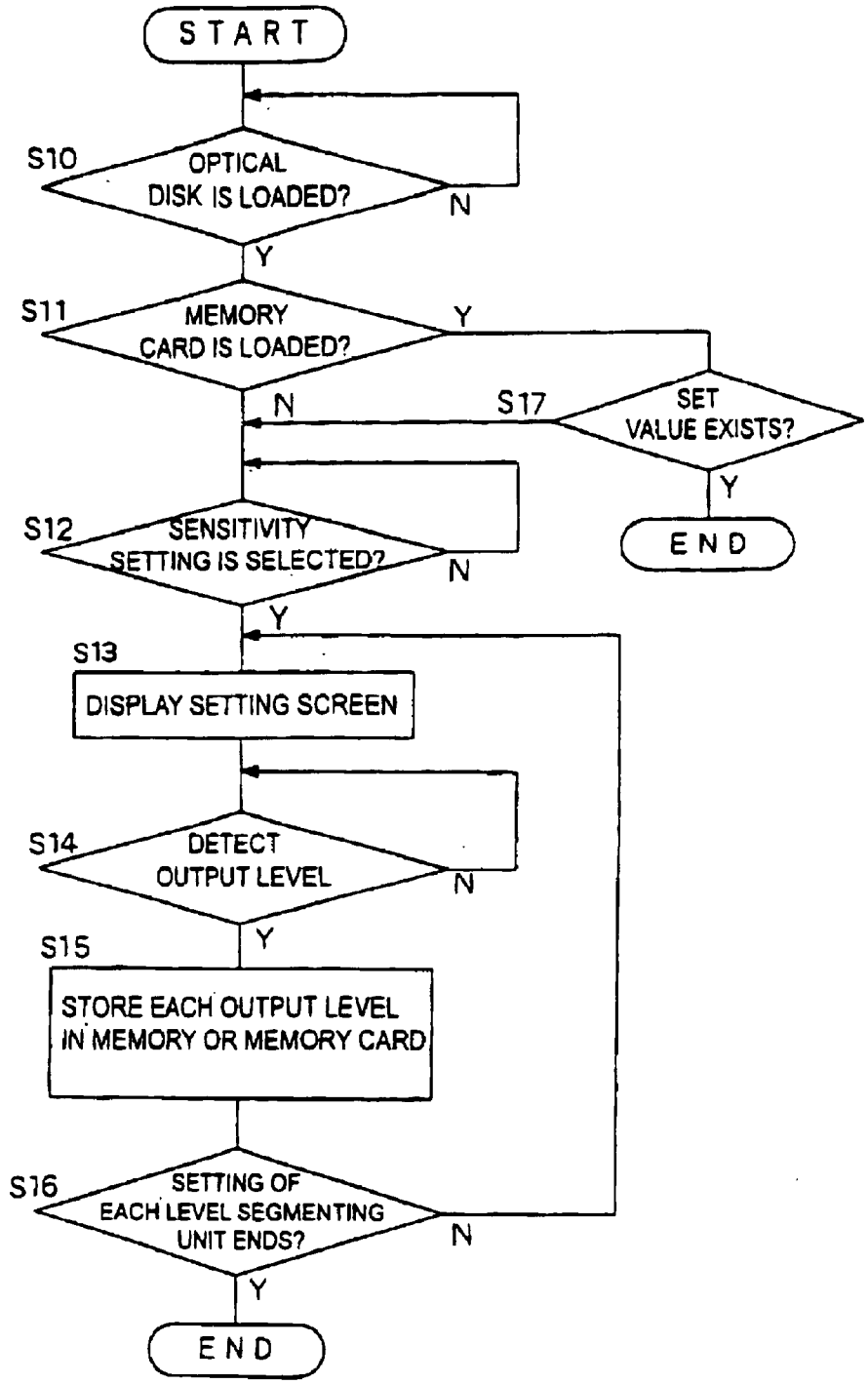
FIG. 9 is a flowchart showing another example of the setting program for calibration which is applied to the second structural example shown in FIG. 7.

FIG. 9 is a flowchart showing another example of the setting program.

To start with, the optical disk is loaded in the game machine main body 100 (step S10). Thereafter, it is checked to see if the memory card 112 is loaded in the game machine main body 100 (step S11). If the memory card 112 is not loaded, the users menu-selection causes the selection of the sensitivity setting (calibration) of the control unit (step S12), and the setting screen is displayed on the television receiver 120 (step S13). For instance, a message for prompting the user to strongly press the controller 11 which is provided in the predetermined control unit is displayed on the setting screen. When the user strongly presses the controller 11 according to the display, the output level of the analog signal from the pressure-sensitive device 12 which is detected in this case is outputted to the game machine main body 100 (step S14). The output level is stored in the built-in memory 111 (step S15). The above-mentioned steps are repeated far the level segmenting unit 15 in the control apparatus 200 (step S16), and the sensitivity setting of the control unit ends.

If it is detected in step S11 that the memory card 112 is loaded, it is checked to see if a set value regarding a calibration has already been stored in the memory card 112 (step S17). If the result is YES in step S17, the sensitivity setting of the control unit ends. In this case, the level segmenting unit 15 provided in the control apparatus 200 adjusts, on the basis of the set value which is stored in the memory card 112, the range of output levels of the analog signal which is to be segmented.

If there is no set value regarding the calibration stored in the memory card 112, the processing sequence proceeds to step S12, and the above-mentioned calibration operation is performed. Then, the output level of the analog signal from the pressure-sensitive device 12 which is detected in step S15 is stored in the memory card 112 (step S16).

The level segmenting unit 15 provided in the control apparatus 200 adjusts, on the basis of the set value which is stored in the built-in memory 111 in the game machine main body 100 or memory card 112 therein, the range of output levels of the analog sigal which is to be segmented.

Figure 10:
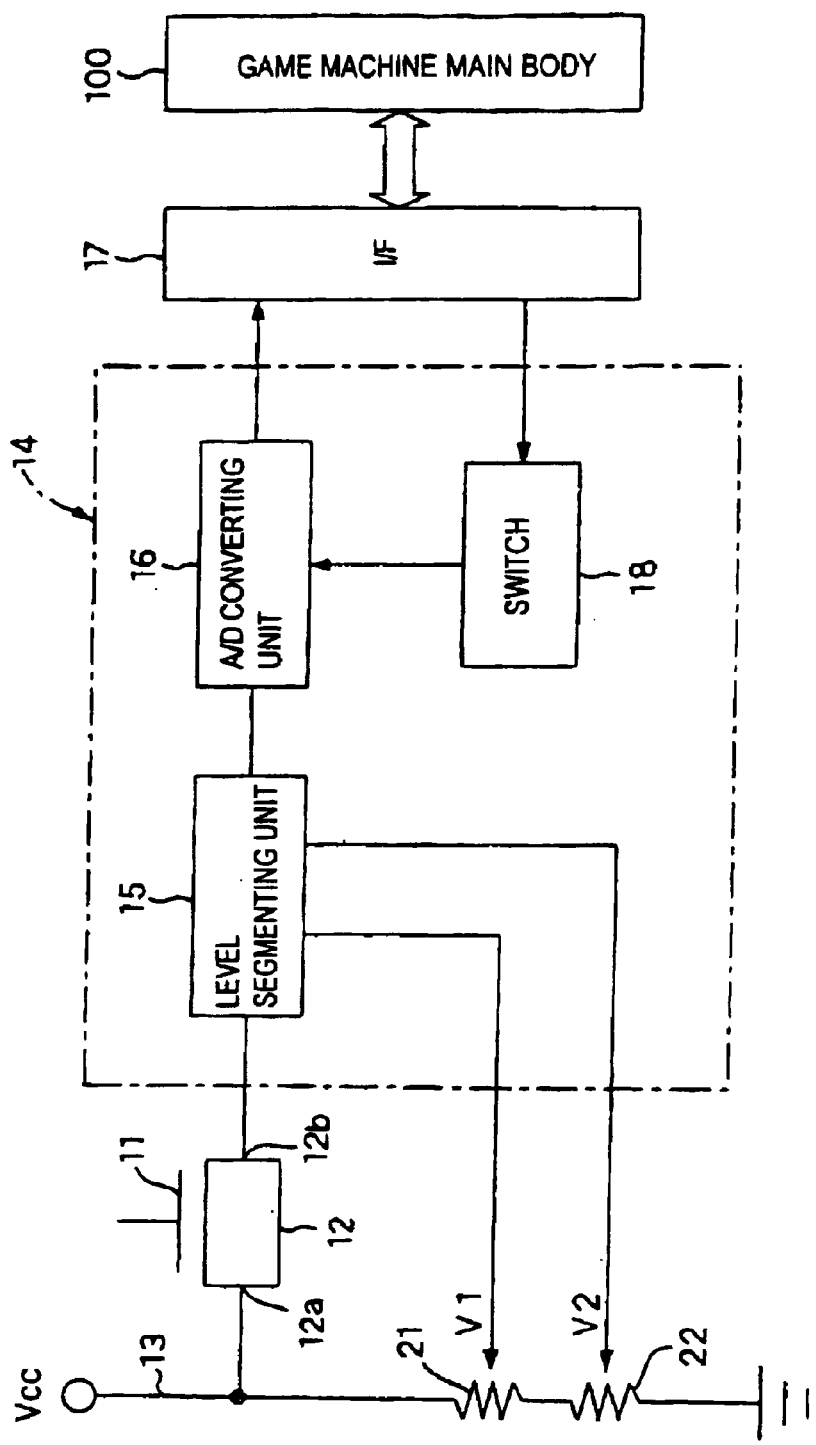
FIG. 10 is a block diagram showing a third structural example for calibration of the level segmenting unit.

FIG. 10 is a block diagram showing a third structural example for calibration of the level segmenting unit 15. According to the configuration shown in the figure, two volume devices 21 and 22 (serving as electric-potential setting devices) are serially connected to the power line 13 to which the pressure-sensitive device 12 of the control apparatus 200 is connected. The volume devices 21 and 22 enable an intermediate voltage of the power line 13 to be adjusted.

Figure 11:
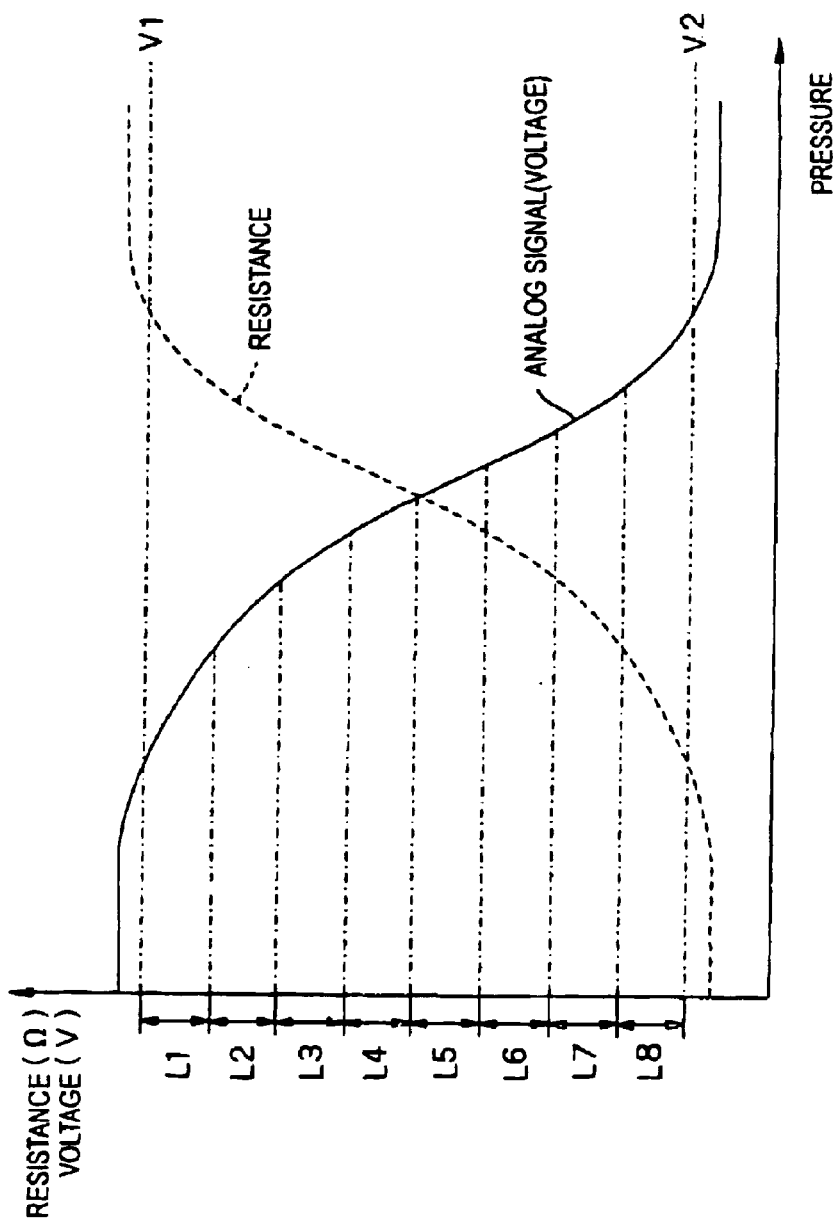
FIG. 11 is a diagram for explaining the calibration operation of the third structural example shown in FIG. 10.

The level segmenting unit 15 sets the range of output levels of the segmented analog-signal on the basis of intermediate voltages V1 and V2 of the power line 13 which are adjusted by the volume devices 21 and 22, as shown in FIG. 11. In other words, the level segmenting unit 15 sets the intermediate voltage V1, which is detected by the one volume device 21 on the side near the power source Vcc, to the maximum value in the range of output levels of the segmented analog-signal, sets the intermediate voltage V2, which is detected by the other volume device 22, to the minimum value in the range of output levels of the segmented analog-signal, and uniformly segments the output level of the analog signal which is outputted by the pressure-sensitive device 12 within the range of the intermediate voltage V1 to V2. The volume devices 21 and 22 may be adjusted, for instance, when shipping the control apparatus 200.

If monitoring functions for the intermediate voltages V1 and V2 are added to the level segmenting unit 15 and the secular change, etc. and the intermediate voltages V1 and V2 fluctuate, the range of output levels of the segmented analog-signal may be adjusted on the basis of the intermediate voltages V1 and V2 after the fluctuation. If the thus-constructed auto-calibration function is added, it is possible to always maintain the proper setting, when the intermediate voltages V1 and V2 fluctuate in accordance with the secular change of the pressure-sensitive device 12 and volume device and variations in the power supply, because the range of output levels of the segmented analog-signal is adjusted on the basis of the intermediate voltages V1 and V2 after fluctuation.

However, if the level segmenting unit 15 always executes the auto-calibration, there is a danger that the output to the game machine main body 100 is delayed. In this case, only when the power supply of the control apparatus 200 is turned on, the level segmenting unit 15 may adjust the range of output levels of the analog signal, by which the intermediate voltages V1 and V2 of the power line 13 are checked, and which are segmented.

Figure 12:
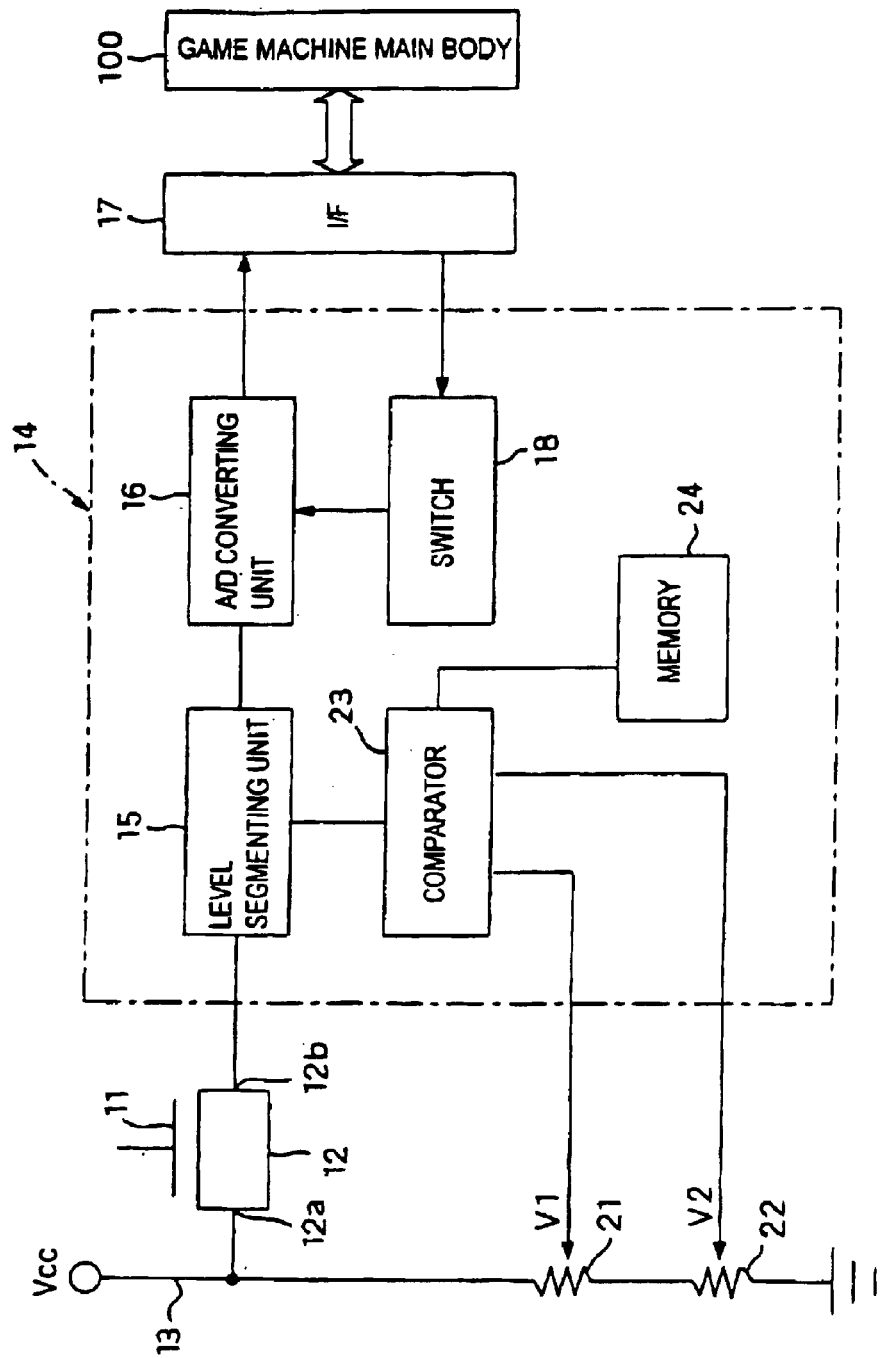
FIG. 12 is a block diagram showing a fourth structural example for calibration of the level segmenting unit.

FIG. 12 is a block diagram showing a fourth structural example for calibration of the level segmenting unit. According to the constitution shown in the figure, the two volume devices 21 and 22 are inserted in series in the power line 13 to which the pressure-sensitive device 12 in the control apparatus 200 is connected and, further, the MPU 14 includes a comparator 23 and a memory 24.

The limit value of the range of output levels of the analog signal which is segmented by the level segmenting unit 15 is stored in the memory 24 in advance. For example, an allowable voltage of the MPU 14 is stored in the memory 24 as a limit value. The comparator 23 always monitors the intermediate voltages V1 and V2 which are detected by the volume devices 21 and 22, and a function for comparing the limit value which is stored in the memory 24 with the intermediate voltages V1 and V2 (especially, V1) and forcedly sending the limit value to the level segmenting unit 15 when the intermediate voltage is over the limit value is provided. If the limit value is sent from the comparator 23, the range of output levels of the analog signal which is segmented on the basis of the limit value is adjusted.

According to the above-described constitution, if an analog signal of an excessive output level, which is above the processing capacity of the MPU 14, is outputted by the pressure-sensitive device 12, the normal operation of the MPU 14 can be compensated.

Next, a detailed description is given of a structural example of the control unit which is provided in the control apparatus 200 according to the first embodiment of the present invention.

Figure 13:
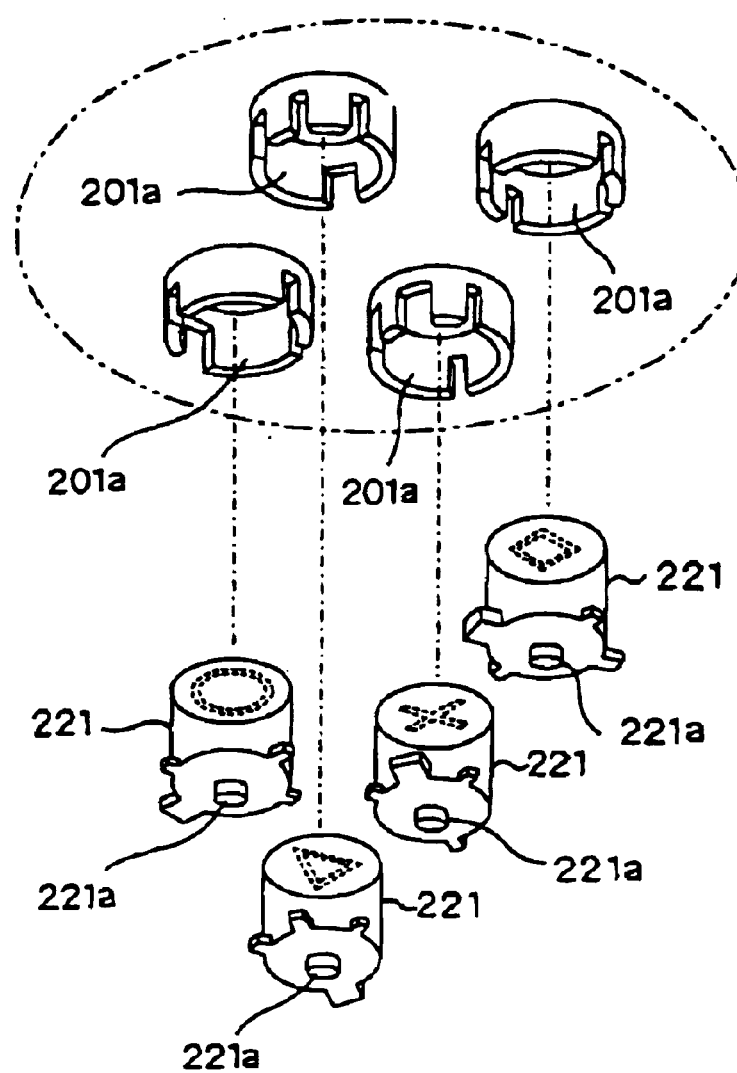
FIG. 13 is an exploded perspective view showing control buttons (controller) which are provided in a second control unit according to the first embodiment.
Figure 14:
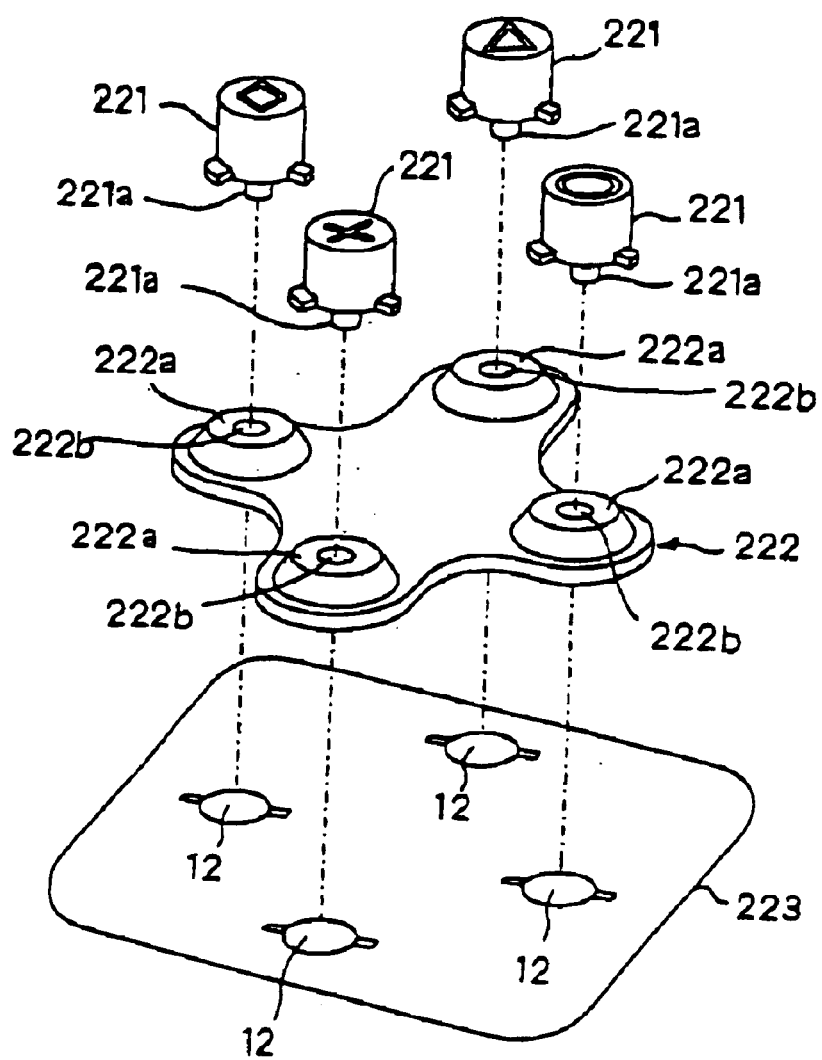
FIG. 14 is an exploded perspective view showing a first structural example of the second control unit according to the first embodiment.
Figure 15:
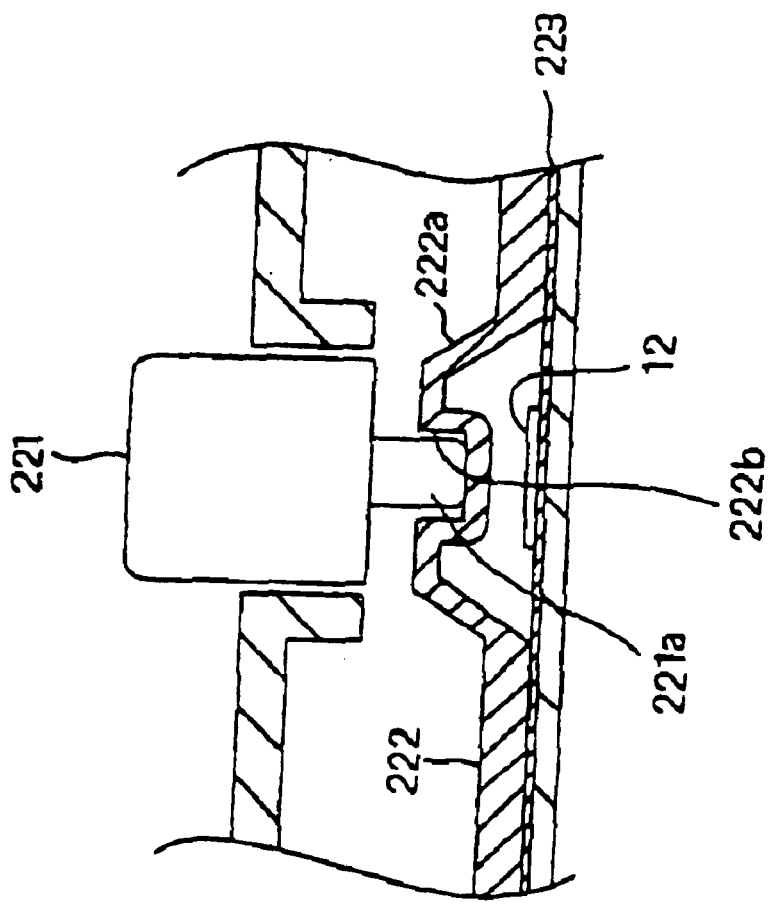
FIG. 15 is a font sectional view showing the fir structural example of the second control unit according to the first embodiment.

FIG. 13 to FIG. 15 are diagrams showing a first structural example of the second control unit.

The second control unit 220 comprises the four control buttons 221 constructing the controller 11, an elastic body 222, and a sheet member 223 in which the pressure-sensitive devices 12 are provided, as shown in FIG. 14. As shown in FIG. 13, the control buttons 221 are mounted, from the back side thereof, to mounting holes 201a which are formed in the upper surface of the device main body 201. The control buttons 221 mounted in the mounting holes 201a are movable in the axial direction.

The elastic body 222 is made of insulative rubber, etc., has elastic portions 222a which are projected upward, and supports the lower ends of the control buttons 221 at the upper surfaces of the elastic portions 222a. If the control buttons 222 are depressed, sloping portions of the elastic portions 222a are bent and the upper surfaces of the elastic portions 222a move together with the control buttons 221. If the pressures to the control button 221 are removed, the sloping portions of the elastic portions 222a which are bent are elastically restored and the control buttons 221 are pushed up. That is, the elastic body 222 functions as energizing means for restoring, the control buttons 221 which are depressed by the operation, to the original positions.

The sheet member 223 is made of a thin-sheet material such as a flexible and insulative membrane. The pressure-sensitive devices 12 are provided at proper portions of the sheet member 223. As shown in FIG. 15, the pressure-sensitive devices 12 are arranged so as to face the control buttons 221 via the elastic body 222.

According to the present structural example, a projection 221a is formed at the bottom of the control buttons 221 serving as the controller 11, and a concave portion 222b for supporting the projection 221a is formed in the elastic portion 222a of the elastic body 222. If the control button 221 is pressed, the projection 221a presses the pressure-sensitive device 12 via the concave portion 222b of the elastic portion 222a.

As mentioned above, the resistance of the pressure-sensitive device 12 changes in accordance with the pressure which is applied from the control button 221. The projection 221a is provided at the bottom of the control button 221 and the projection 221a presses the pressure-sensitive devices 12 so that the pressure can be transmitted to the pressure-sensitive devices 12 with high sensitivity.

However, as a result of pressing the pressure-sensitive device 12 by the projection 221a, the pressure which acts on the pressure-sensitive device 12 and the concave portion 222b of the elastic body 222 becomes excessively large and there is a danger of the durability of the pressure-sensitive device 12 and the elastic body 222 decreasing.

Figure 16:
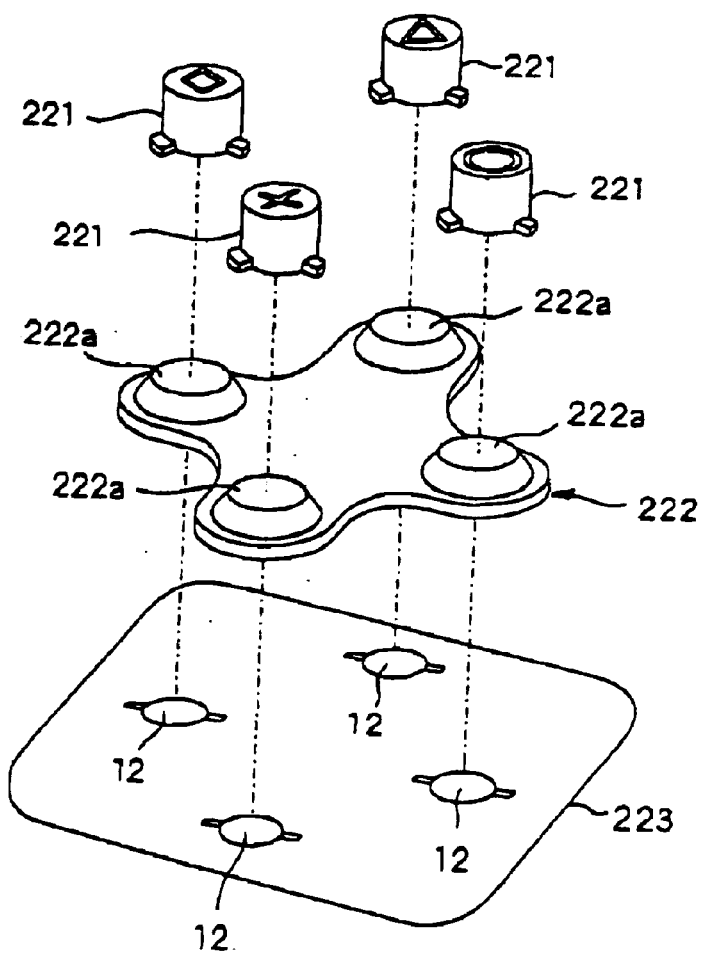
FIG. 16 is an exploded perspective view showing a second structural example of the second control unit according to the first embodiment.
Figure 17:
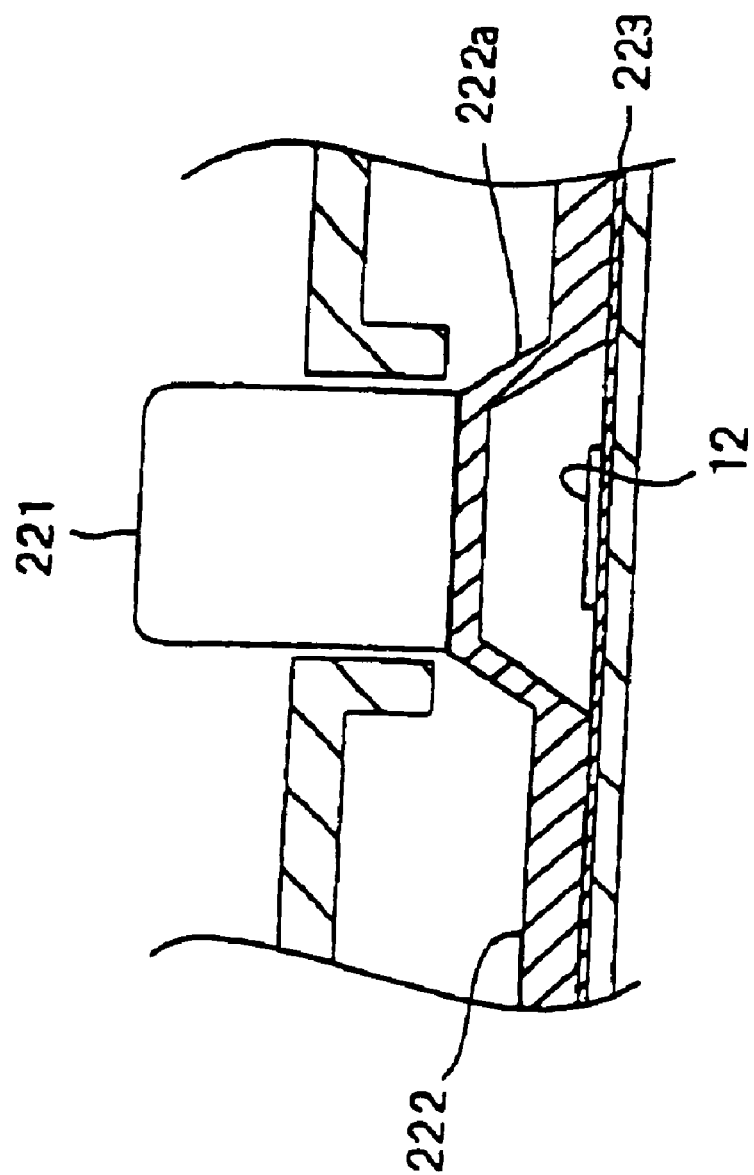
FIG. 17 is a front sectional view showing the second structural example of the second control unit according to the first embodiment.

Next, according to a second structural example shown in FIG. 16 and FIG. 17, the bottom of the control button 221 serving as the controller 11 is flat and the whole of the flat bottom presses the pressure-sensitive device 12. The elastic portion 222a of the elastic body 222 has no concave portion formed therein, and it supports the bottom of the control button 221 by the flat surface thereof. If this construction is used, although the sensitivity with which the pressure from the control buttons 221 is transmitted to the pressure-sensitive device 12 is decreased, the advantage of improved durability of the pressure-sensitive devices 12 and the elastic body 222 is obtained.

Figure 18:
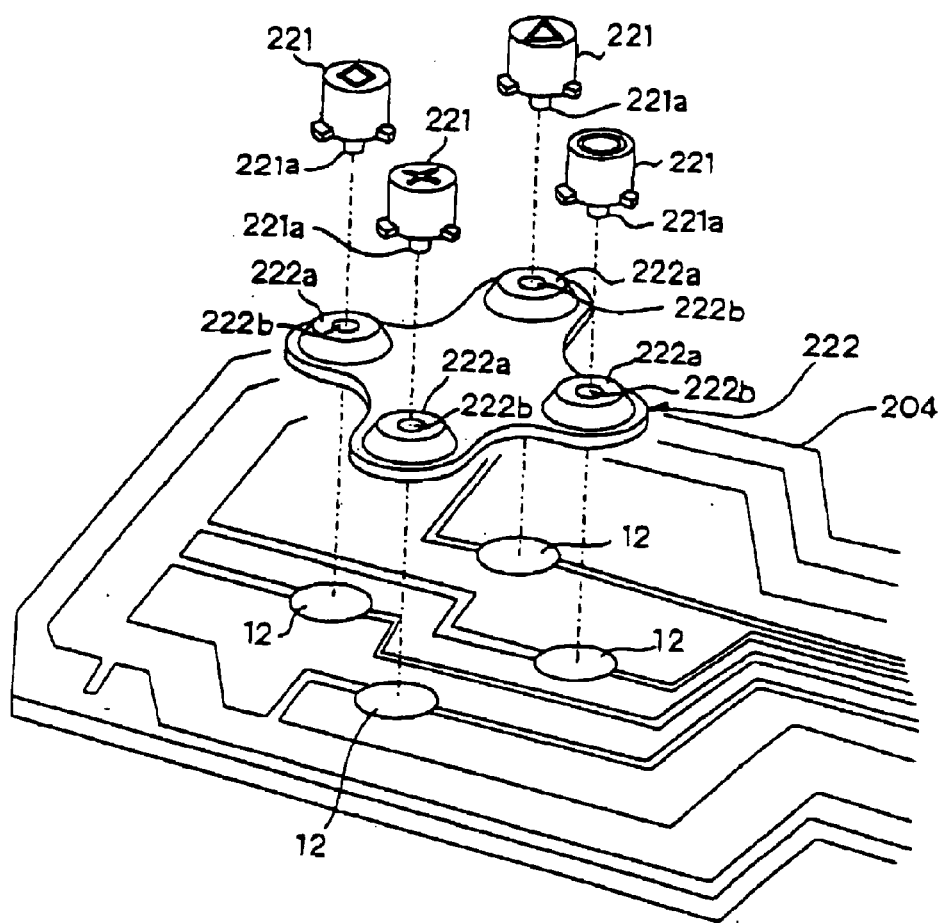
FIG. 18 is an exploded perspective view showing a third structural example of the second control unit according to the first embodiment.
Figure 19:
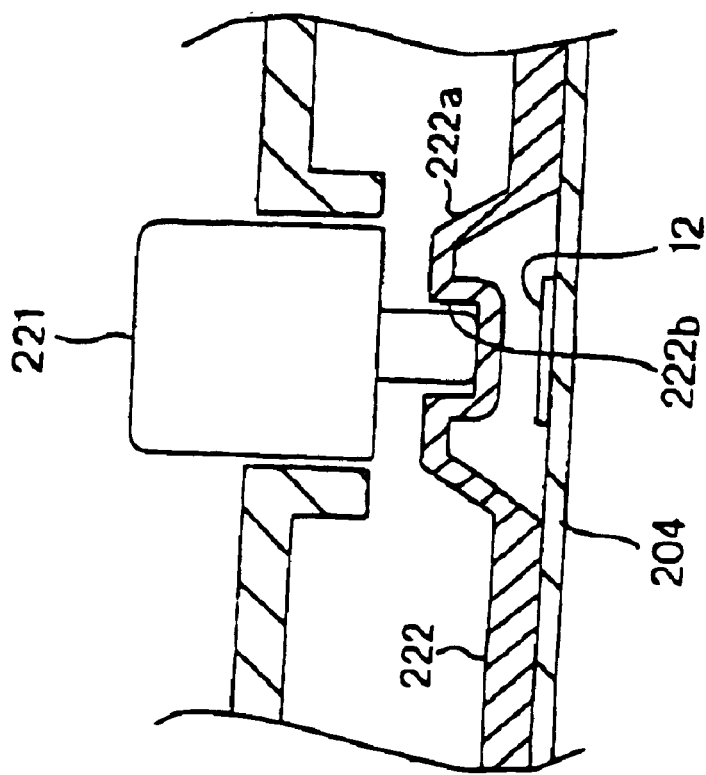
FIG. 19 is a front sectional view showing the third structural example of the second control unit according to the first embodiment.

FIG. 18 and FIG. 19 are diagrams showing a third structural example of the second control unit.

According to the third structural example shown in the figures, the pressure-sensitive devices 12 are directly provided at proper portions on an internal board 204 which is built in the control apparatus 200. By providing the pressure-sensitive devices 12 on the internal board 204, the sheet member can be omitted and the number of parts can be reduced. Incidentally, of course, the pressure-sensitive devices 12 are provided at portions to which the pressure from the control buttons 221 is transmitted.

Figure 20:
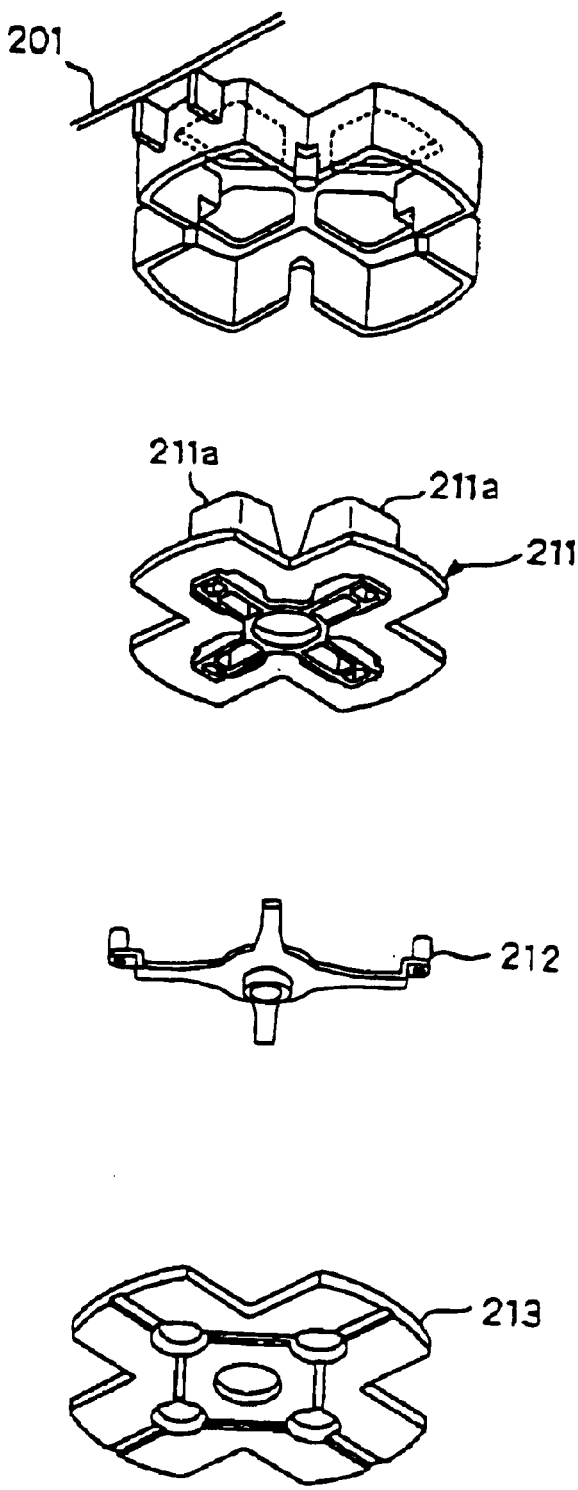
FIG. 20 is an exploded perspective view showing a structural example of a first control unit according to the first embodiment.
Figure 21:
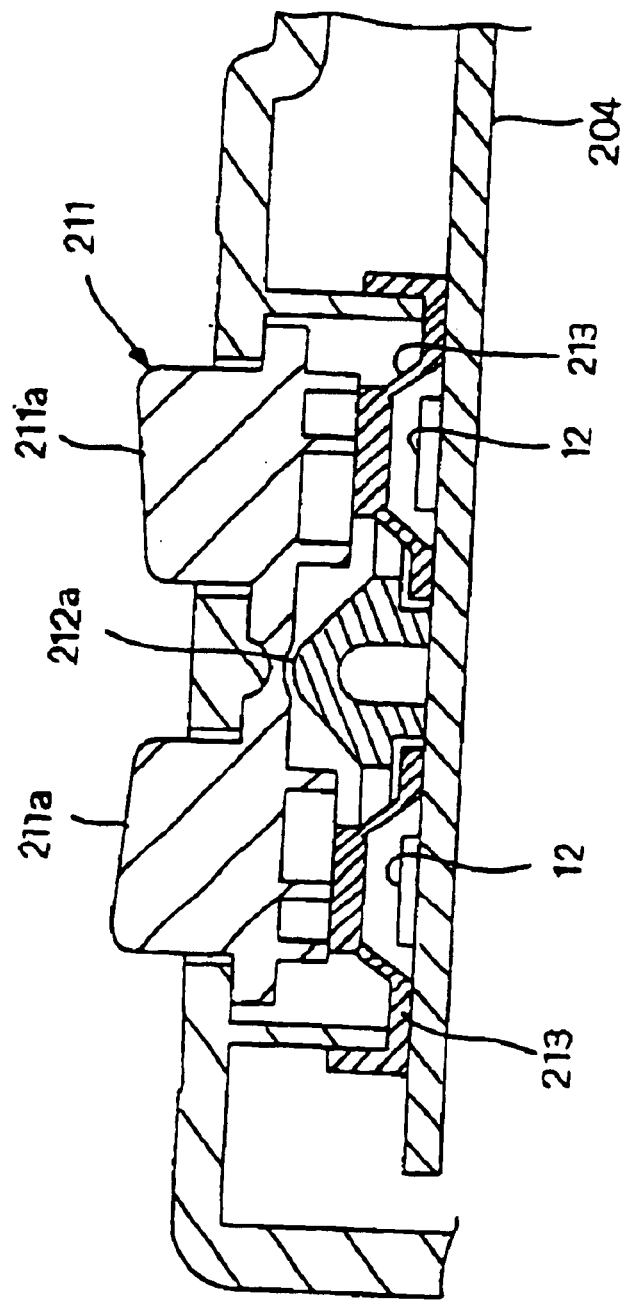
FIG. 21 is a front sectional view showing the structural example of the first control unit according to the first embodiment.

FIG. 20 and FIG. 21 are diagrams showing a structural example of the first control unit.

As shown in FIG. 20, the first control unit 210 comprises the cross-shaped control body 211, a spacer 212 for positioning the control body 211, and an elastic body 213 for elastically supporting the control body 211 and, further, as shown in FIG. 21, has a configuration in which the pressure-sensitive devices 12 are arranged at positions which face the control keys 211a (controller 11) of the control body 211 via the elastic body 213.

The overall/general structure of the first control unit 210 is well known from Japanese Patent Laid-Open (unexamined) No. 8-163672, etc., and thus a detailed description is omitted. However, the control body 211 is assembled so as to enable the control keys 211a (the controller) to be pressed to the sides of the pressure-sensitive devices 12 (FIG. 21) while a convex portion 212a having hemispheric shapes which is formed at the center of the spacer 212 is set at the fulcrum.

If the control key 211a serving as the controller 11 is pressed, the pressure acts on the press sensitive device 12 via the elastic body 213 and the resistance of the pressure-sensitive device 12 is changed in accordance with the magnitude of the pressure. The structural example shown in FIG. 21 illustrates that the pressure-sensitive devices 12 are directly provided at proper portions on the internal board 204 which is built in the control apparatus 200. However, similarly to the structural example of the second control unit 220 shown in FIGS. 14 and 15, the pressure-sensitive devices 12 can be provided on the sheet member 23.

Figure 22:
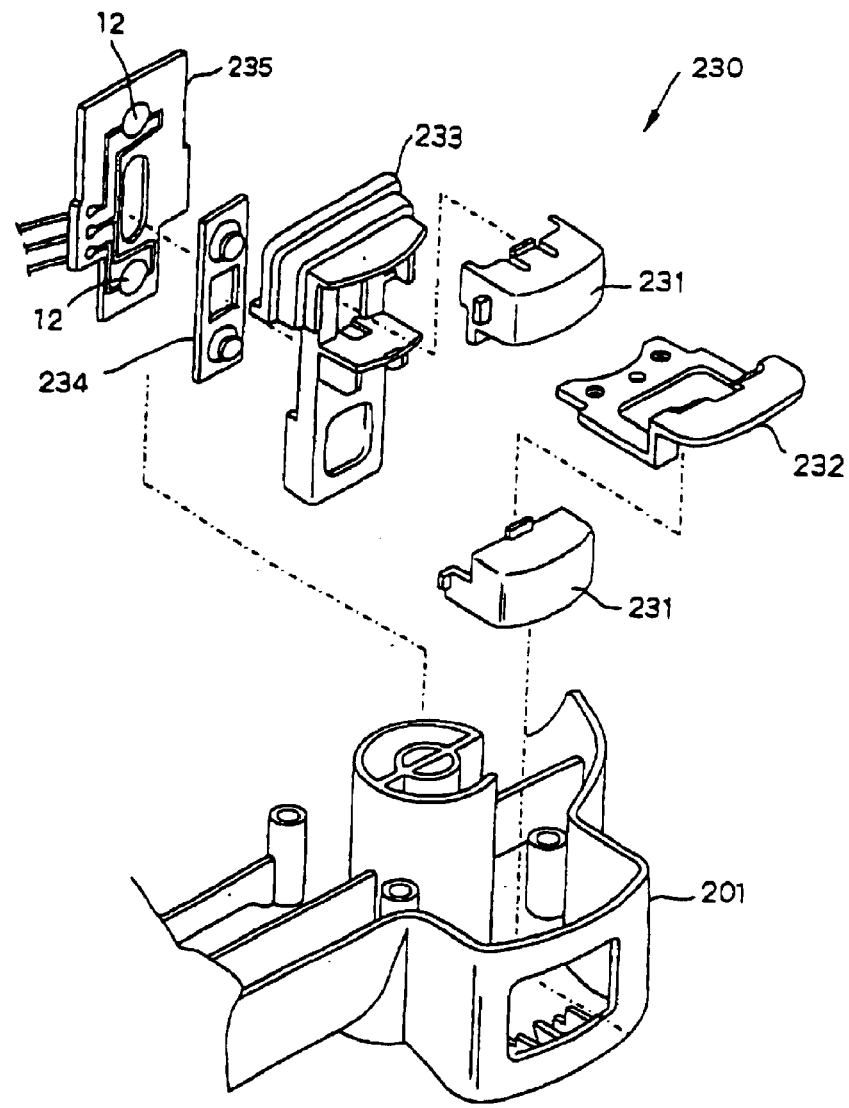
FIG. 22 is an exploded perspective view showing a structural example of a third control unit according to the first embodiment.
Figure 23:
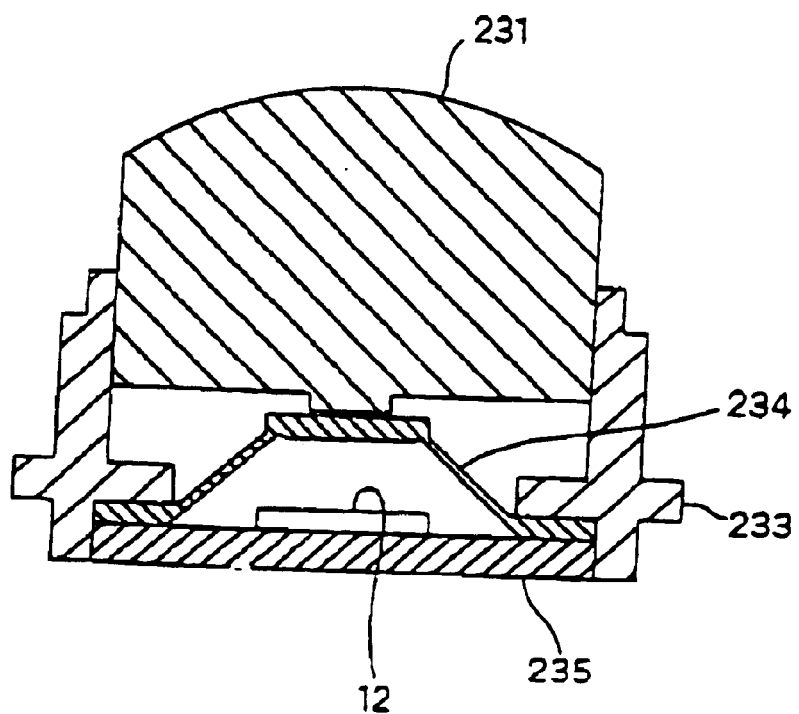
FIG. 23 is a front sectional view showing the structural example of the third control unit according to the first embodiment.

FIG. 22 and FIG. 23 are diagrams showing a structural example of the third control unit.

The third control unit 230 comprises the two control buttons 231, a spacer 232 for position the control buttons 231 in the control apparatus 200, a holder 233 for supporting the control buttons 231, an elastic body 234, and an internal board 235, and has the pressure-sensitive devices 12 to proper portions on the internal board 235.

The overall/general structure of the third control unit 230 is also well-known from Japanese Unexamined Patent Laid-Open (unexamined) No. 8-163672, etc., and thus a detailed description is omitted. However, the control buttons 231 can be pressed while being guided by the spacer 232. The pressure when the control buttons 231 are pressed acts on the pressure-sensitive devices 12 via the elastic body 234. The resistance of the pressure-sensitive devices 12 is changed in accordance with the magnitude of the applied pressure. The structural example shown in FIGS. 22 and 23 illustrate that the pressure-sensitive devices 12 are directly provided at proper portions of the internal board 235 which is built in the control apparatus 200. However, similarly to the structural example of the second control unit 220 shown in FIG. 14 and FIG. 15, the pressure-sensitive device 12 can also be provided on the sheet member 223.

Incidentally, the fourth control unit 240 is also constructed similarly to the third control unit 230.

Although the above description shows the structural examples in the case in which the present invention is applied to the first to fourth control units 210, 220, 230, and 240, the present invention is not limited to be applied to all of the control units. The control unit to which the present invention is applied can be selected arbitrarily and the other control units can have conventional constructions.

[Second embodiment]

Next, a detailed description is given of constitution of a second embodiment of the present invention. Incidentally, the same reference numerals denote the same portion as those of the first embodiment which have already been described, and thus a detailed description thereof is omitted.

The control apparatus 200 according to the first embodiment generates both a digital signal having a plurality of bits and a digital signal having a single bit on the basis of the analog signal which is outputted by the pressure device 12. However, according to the second embodiment, as will be described hereinbelow, a digital signal having a plurality of bits is generated from the analog signal outputted by the pressure-sensitive device 12 and, a digital signal having a single bit is outputted by detecting the on/off state of a digital switch.

Figure 24:
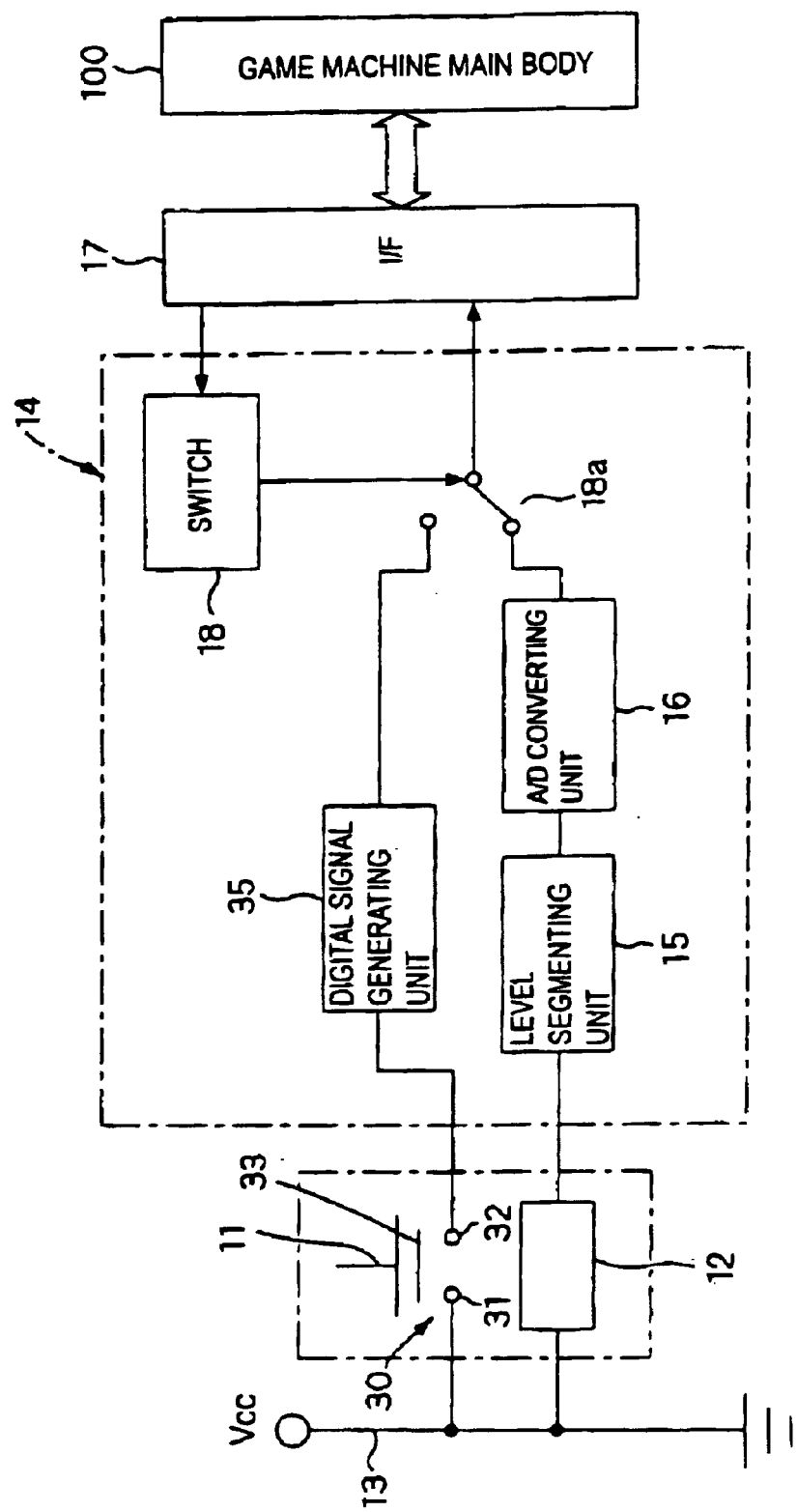
FIG. 24, is a block diagram showing the main portion in a control apparatus according to a second embodiment of the present invention.

FIG. 24 is a block diagram showing the main portion of a control apparatus according to the second embodiment.

According to the present embodiment, the control units 210, 220, 230, and 240 in the control apparatus 200 have the controller 11 comprising the control buttons 221, 231 and 241 and the control keys 211a of the control body 211; the pressure-sensitive device 12 (detecting device); and a digital switch 30. Among them, the controller 11 and pressure-sensitive device 12 have a similar construction to those in the control apparatus 200 according to the above-mentioned first embodiment.

The digital switch 30 comprises first and second fixed-terminal 31 and 32 and a movable member 33 which is connected/disconnected to the fixed terminal 31 and 32 and whereby the fixed terminals are connected or disconnected. The movable member 33 moves in accordance with the pressing operation of the controller 11 and connects or disconnects the first and second fixed terminals 31 and 32. As shown in FIG. 24, the first fixed terminal 31 of the digital switch 30 is connected to the power line 13, thereby applying a predetermined voltage thereto from the power source (Vcc).

The MPU 14 provided on the internal board of the control apparatus 200 comprises a digital-signal generating unit 35 for detecting the on/off state of the digital switch 30 and outputting a digital signal having a single bit, a change-over switch 11a for switching the output from the digital-signal generating unit 35 and the output from the A/D converting unit 16 and outputting the signal to the outside, the switch 18 for operating the change-over switch 18a, the level segmenting unit (LS) 15, and of the A/D converting unit 16.

The A/D converting unit 16 according to the present embodiment has only the function of converting the analog signal outputted by the pressure-sensitive device 12 into a digital signal having a plurality of bits and outputting the converted digital signal.

The input terminal of the digital-signal generating unit 35 is connected to the second fixed terminal 32 of the digital switch 30, thereby monitoring a voltage change which is caused at the second fixed terminal 32. In other words, if the digital switch 30 is turned on, the second fixed terminal 32 has the same potential as that of the power line 13. If the digital switch 30 is turned off, the second fixed switch 32 is set to 0 V. The digital-signal generating unit 35 outputs the digital signal having a single bit ("0" or "1") in accordance with the voltage change which is caused at the second fixed terminal 32.

According to the present embodiment, the switch 18 is also controlled in response to the control signal which is sent by the game machine main body 100 on the basis of the game program that is recorded in the optical disk. That is, if the game program which is loaded in the optical disk is executed, the game machine main body 100 outputs the control signal to connect the changeover switch 18a to the A/D converting unit 16 side or to connect the change-over switch 18a to the digital-signal generating unit 35. Based on the control sign, the switch 18 operates the change-over switch 18a.

The change-over switch 18a may also be switched by the user's manual operation. For instance, a function for switching the switch 18 can be allocated to the analog-selecting switch 252 which is provided in the control apparatus 200, and the change-over switch 18a can be operated by the manual operation of the analog-selecting switch 252.

According to the control device 200 of the second embodiment having the above-mentioned construction, the movable member 33 of the digital switch 30 connects the first and second fixed terminals 31 and 32 in accordance with the pressing operation of the controller 11 and the analog signal is outputted by the pressure-sensitive device 12 in accordance with the pressure which is applied by the controller 11. The digital-signal generating unit 35 outputs the digital signal having a single bit in accordance with the change in state of the digital switch 30, and the A/D converting unit 16 outputs the digital signal having a plurality of bits which has the output level in accordance with the pressure applied to the pressure-sensitive device 12.

Therefore, the selection by the change-over switch 18a causes the control apparatus 200 to output either the digital signal having the single bit or the digital signal having the plurality of bits to the game machine main body 100.

Figure 25:
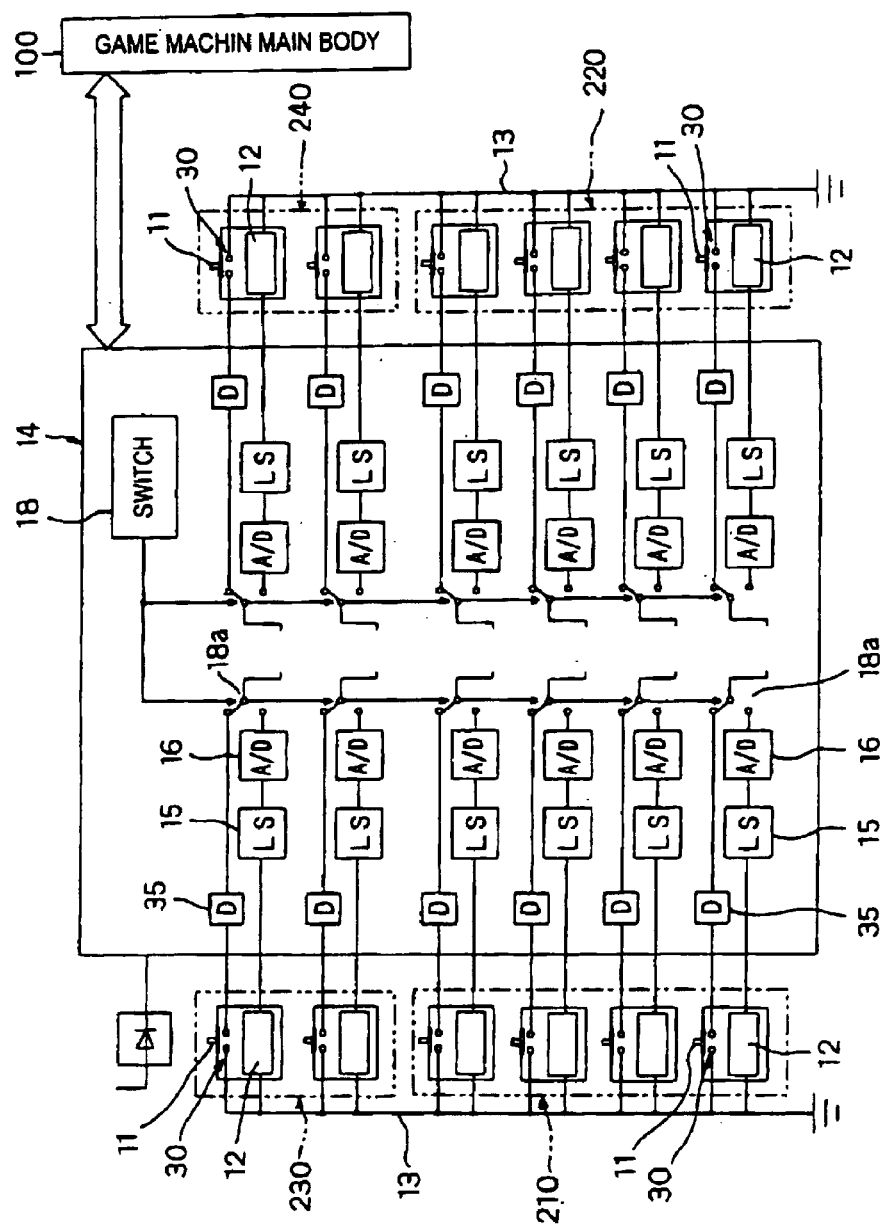
FIG. 25 is a block diagram showing one example of the entire configuration of the control apparatus according to the second embodiment of the present invention.
Figure 26:
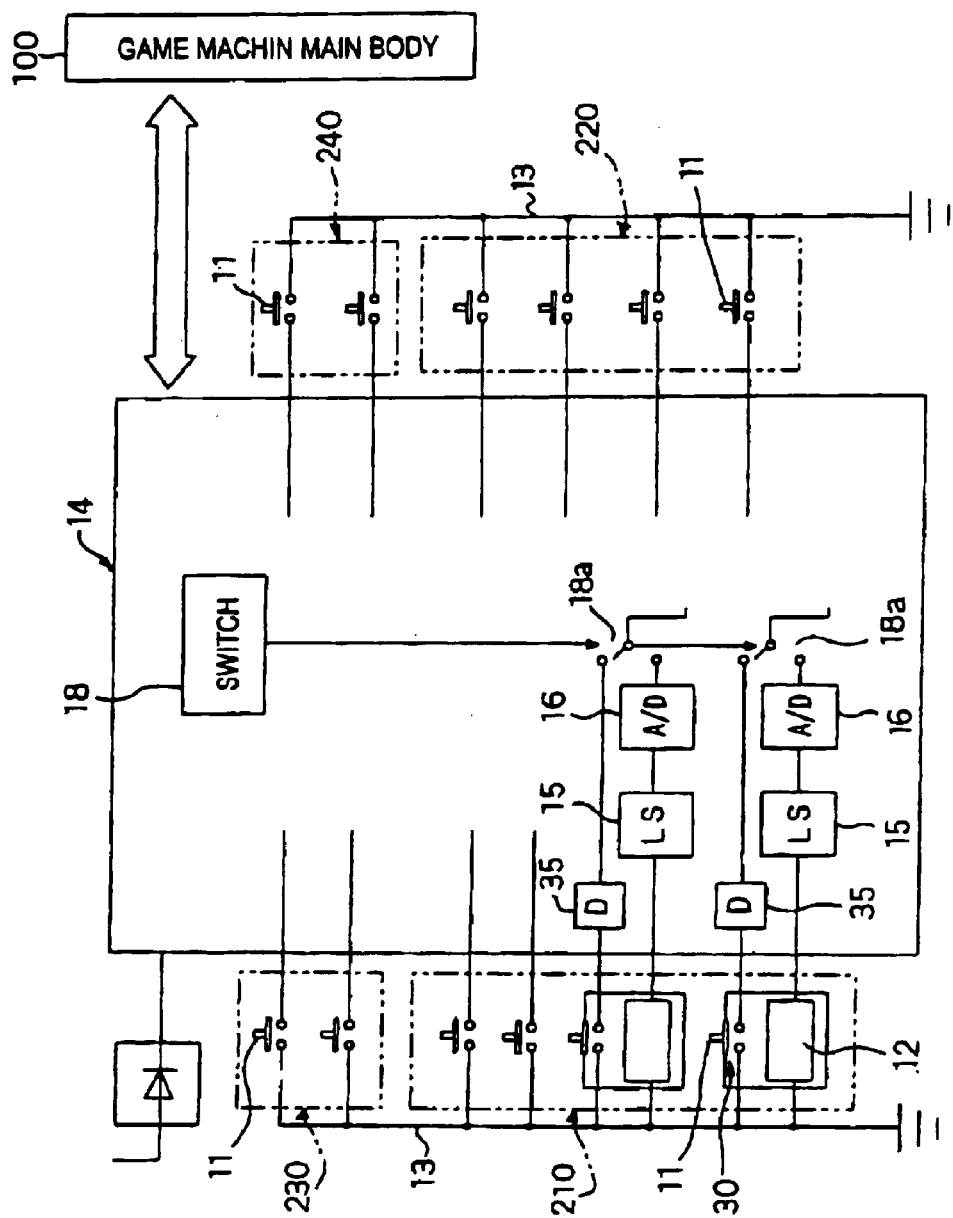
FIG. 26 is a block diagram showing another example of the entire configuration example of the control apparatus according to the second embodiment of the present invention.

According to the present embodiment, as shown in FIG. 25, the first to fourth control units 210, 220, 230, and 240 have the construction shown in FIG. 24. Thus, it is possible for each of the control units to separately use digital operation or analog operation. Incidentally, as shown in FIG. 26, it is also possible for only the control unit which is arbitrarily selected from among the fag to fourth control units 210, 220, 230, and 240 to have the construction shown in FIG. 24.

The control apparatus 200 according to the present embodiment also has the calibration function (segmenting-range adjusting unit) for individually setting the range of output levels of the analog signal which is to be segmented by the level segmenting unit 15, as shown in FIGS. 6, 7, 10, and 12.

Next, a detailed description is given of structural examples of the second control unit which is provided in the control apparatus 200 according to the second embodiment of the present invention with reference to the drawings.

Figure 27:
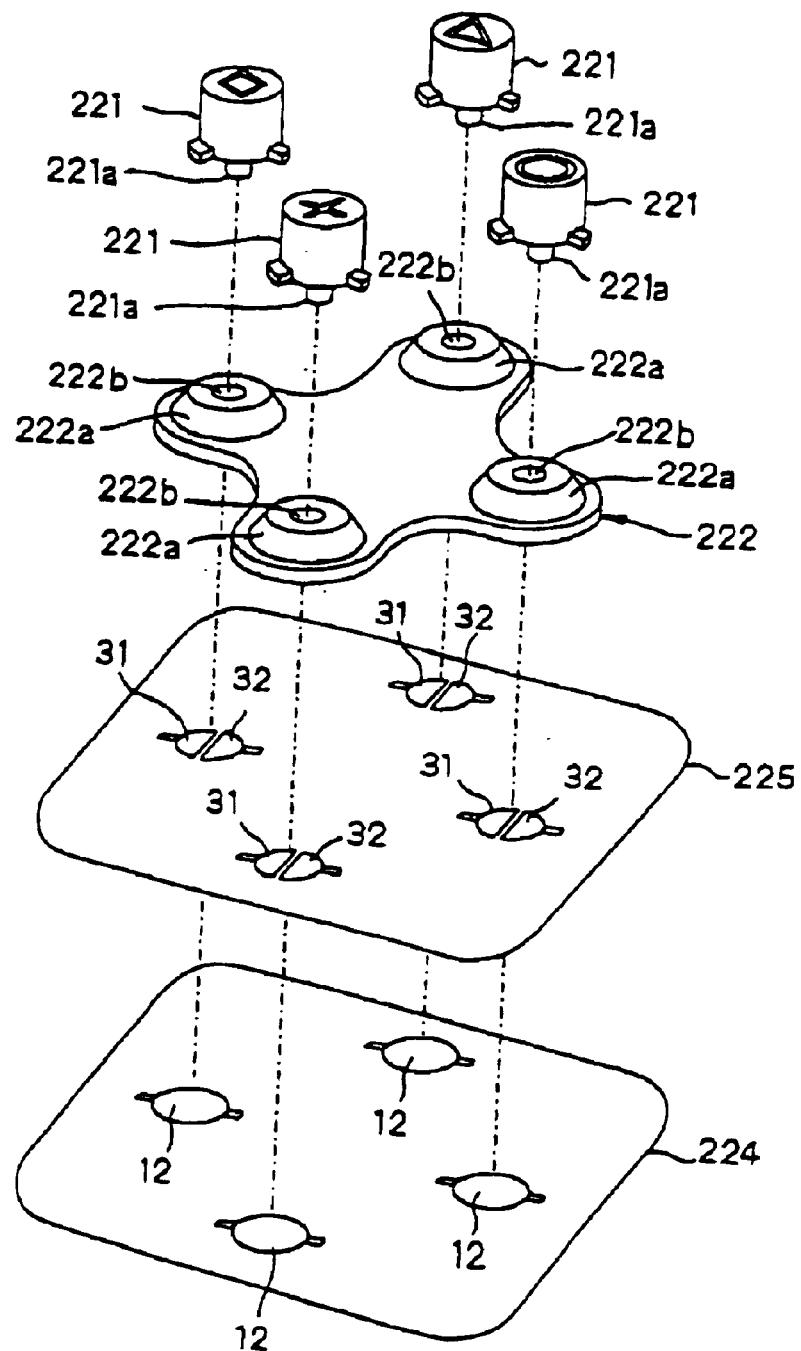
FIG. 27 is an exploded perspective view showing a first structural example of a second control unit according to the second embodiment.
Figure 28:
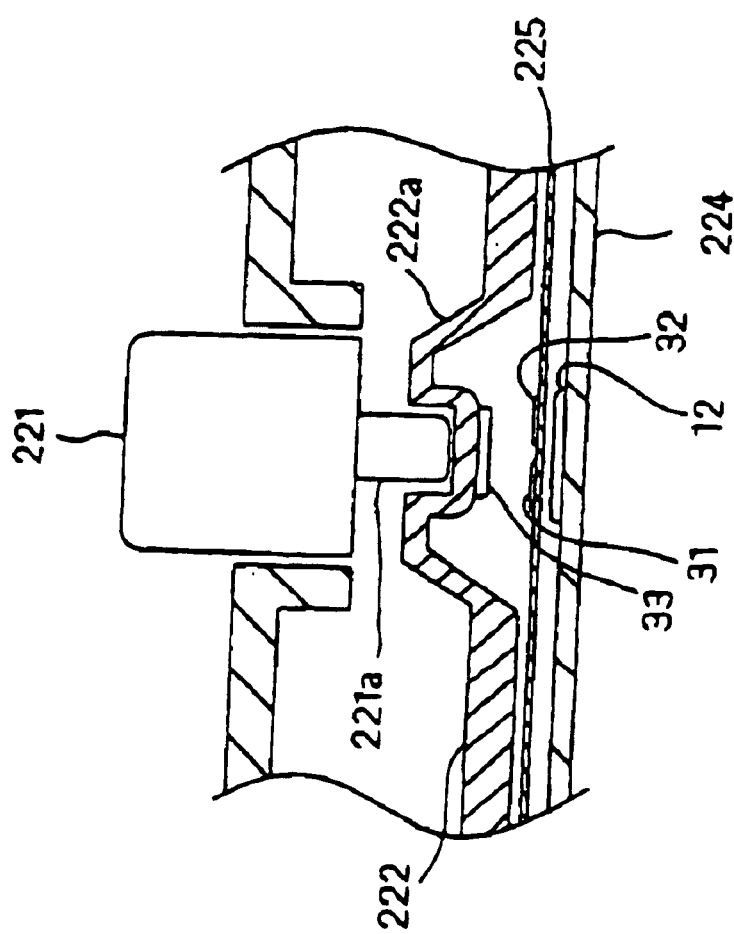
FIG. 28 is a front sectional view showing the first structural example of the second control unit according to the second embodiment.

FIG. 27 and FIG. 28 are diagrams showing a first structural example according to the present embodiment.

The second control unit 220 comprises, four control buttons 221 serving as the controller 11, an elastic body 222, a sheet member 224 on which the pressure-sensitive devices 12 are provided, and a sheet member 225 on which the first and second fixed terminals 31 and 32 of the digital switch 30 are provided, as shown in FIG. 27. The control buttons 221 are mounted in mounting holes 201a which are formed in the upper surface of the device main body 201 from the back side, similarly to the aforementioned case in the first embodiment (refer to FIG. 13). The control buttons 221 which are mounted in the mounting holes 201a can be moved in the axial direction.

The elastic body 222 is made of insulative rubber, etc., has elastic portions 222a which project upward, and supports the lower ends of the control buttons 221 at the upper surfaces of the elastic portions 222a. If the control buttons 221 are depressed, sloping portions of the elastic portions 222a are bent and the upper surfaces of the elastic portions 222a are moved together with the control buttons 221. If the pressures to the control buttons 221 are removed, the sloping portions of the elastic portions 222a which are bent are elastically restored, and the control buttons 221 are pushed up. That is, the elastic body 222 functions as energizing means for restoring the control buttons 221, which are depressed by the pressing operation, to the original positions.

The movable member 33 of the digital member 30 is formed at the inside of the ceiling surface of the upper surfaces of the elastic portions 222a (refer to FIG. 28). The movable member 33 is made of a conductive material and moves down by deformation of the elastic portions 222a due to bending according to the pressing operation of the control buttons 221.

The sheet member 225 is made of a thin-sheet material such as a flexible and insulative membrane. The first and second fixed terminals 31 and 32 are provided at proper portions of the sheet member 225. As shown in FIG. 28, the first end second fixed terminals 31 and 32 are arranged so as to face the movable member 33. According to the structure, the movable member 33 formed below the upper surfaces of the elastic portions 222a is moved in accordance with the pressing operation of the control buttons 221 serving as the controller 11 and makes contact with the first and second fixed terminals 31 and 32, thereby electrically connecting the fixed terminals 31 and 32.

The sheet member 224 is also made of an insulative thin-sheet material. The pressure-sensitive devices 12 are provided at proper portions of the sheet member 224. As shown in FIG. 28, the pressure-sensitive devices 12 are arranged so as to face the control buttons 221 via the elastic body 222 and the sheet member 225.

As explained above, the shape of the sheet member 225 is flexible and thin, so that it is capable of transmitting the pressure on the control buttons 221 transmitted through the upper walls of the elastic portions 222a and the movable member 33 to the pressure-sensitive devices 12 substantially unchanged.

Figure 29:
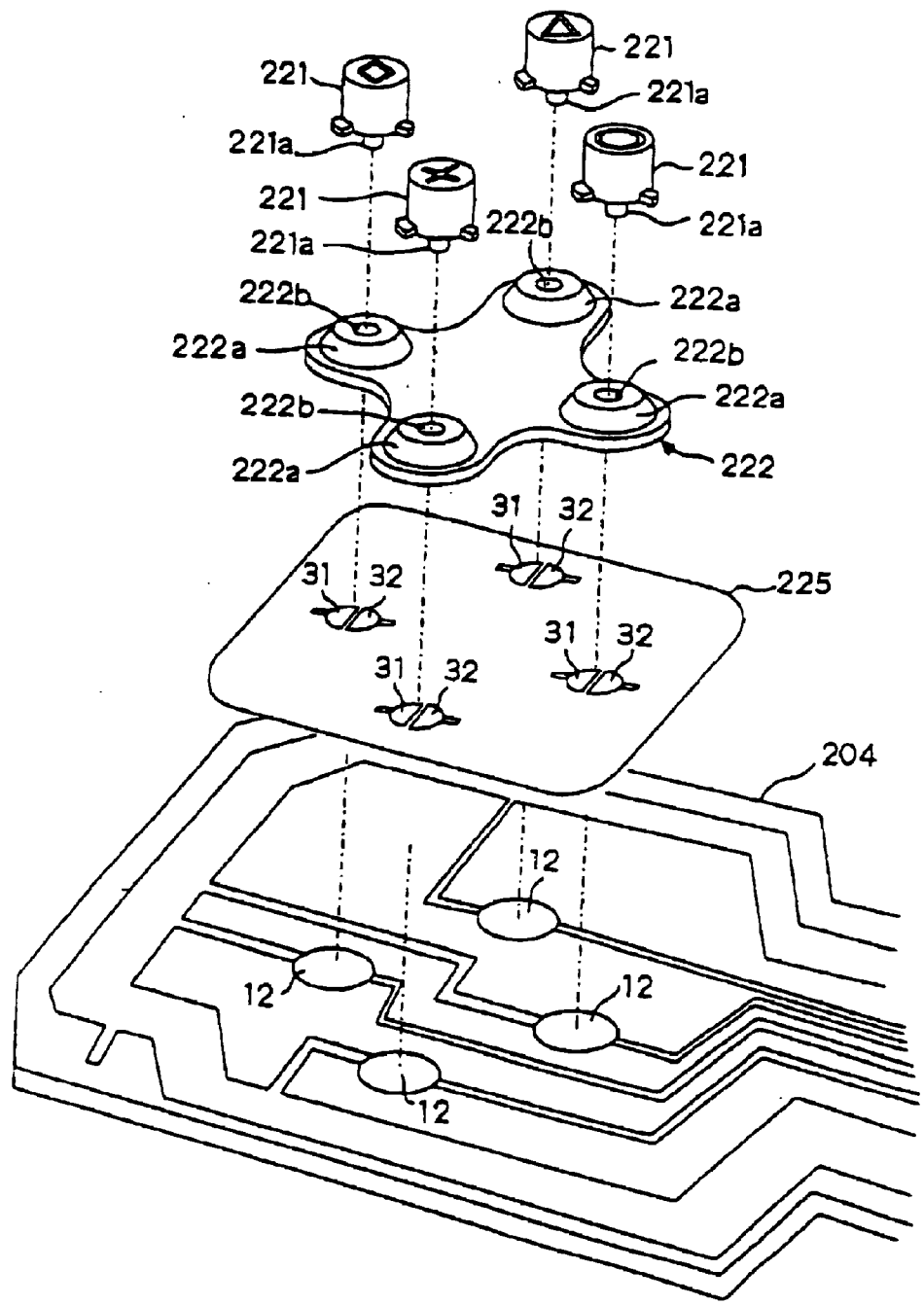
FIG. 29 is an exploded perspective view showing a second structural example of the second control unit according to the second embodiment.
Figure 30:
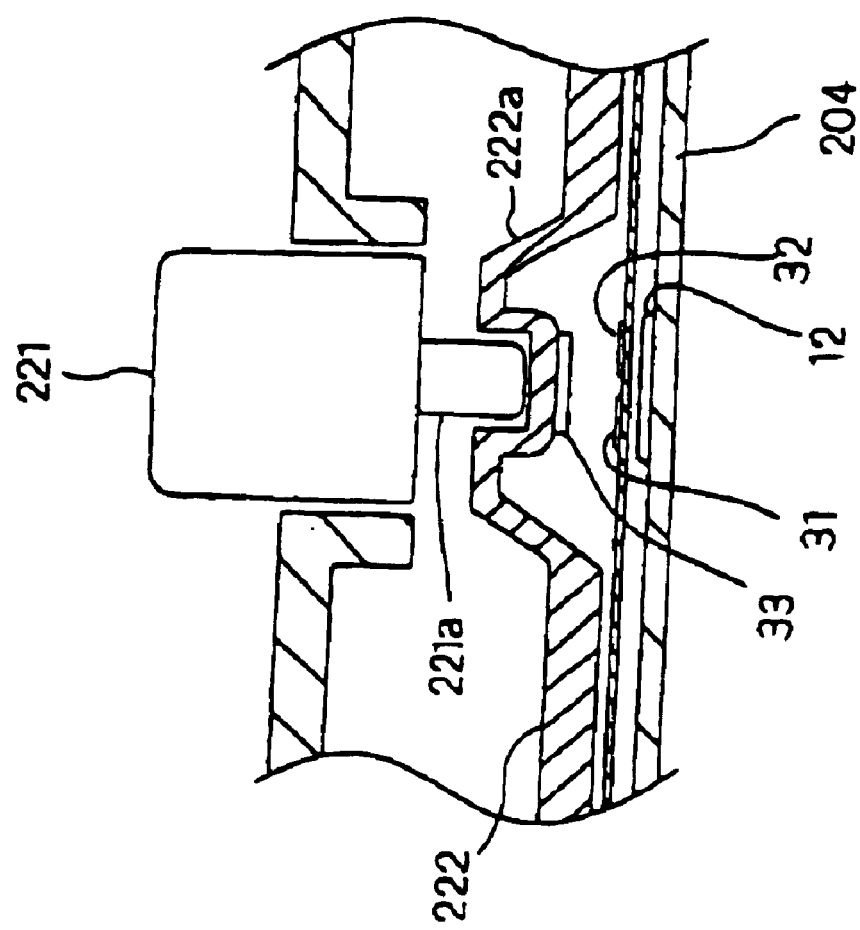
FIG. 30 is a front sectional view showing the second structural example of the second control unit according to the second embodiment.

FIG. 29 and FIG. 30 are diagrams showing a second structural example of the second control unit according to the present embodiment.

According to the second structural example shown in the figures, the pressure-sensitive devices 12 are directly provided at proper portions of the internal board 204 which is built in the control apparatus 200. As a result of directly providing the pressure-sensitive devices 12 on the internal board 204, it is possible to omit the sheet member 224, and to decrease the number of parts. Then, of course, the pressure-sensitive devices 12 are provided at positions to which the pressure from the control buttons 221 transmitted.

Figure 32:
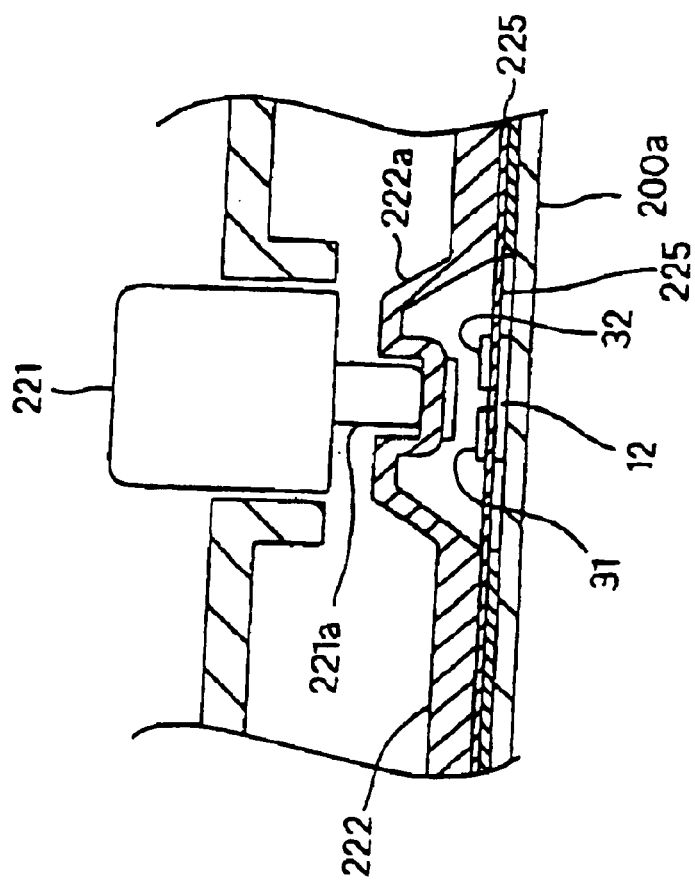
FIG. 32 is a front sectional view showing the third structural example of the second control unit according to the second embodiment.

FIGS. 31A, 31B, and 32 are diagrams showing a third structural example of the second control unit according to the present embodiment.

According to the third structural example shown in the figures, the first and second fixed terminals 31 and 32 of the digital switch 30 are provided on the surface of the sheet member 225, and the pressure-sensitive device 12 is provided at the back side of the sheet member 225. The first and second fixed terminals 31 and 32 and the pressure-sensitive devices 12 are positioned so as to face each other by sandwiching the sheet member 225. The sheet member 225 is disposed so that the pressure-sensitive devices 12 are sported in a flat manner by the internal wall 200a of the control apparatus 200 and a wired circuit (refer to FIG. 32).

The above-described structure enables the omission of one sheet member.

Figure 33:
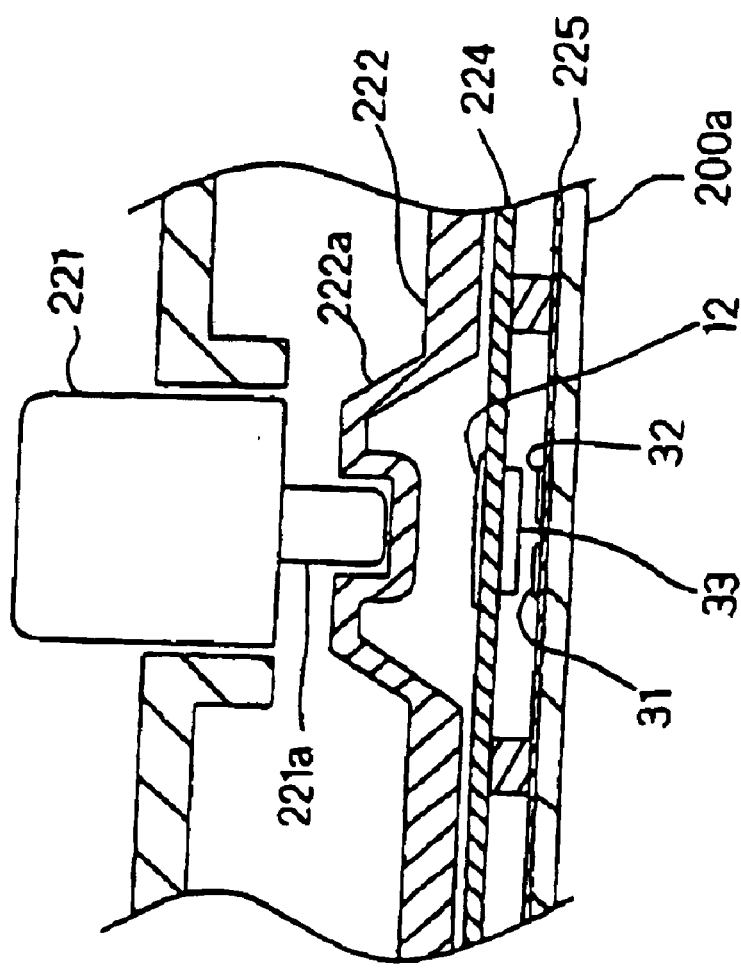
FIG. 33 is a front sectional view showing a fourth structural example of the second control unit according to the second embodiment.

FIG. 33 is a diagram showing a fourth structural example of the second control unit according to the present embodiment.

According to the fourth structural example shown in the figure, the movable member 33 of the digital switch 30 is set at the back side of the sheet member 224 on which the pressure-sensitive device 12 is provided. The arrangement of the sheet member 224 and the sheet member 225 is changed and the sheet member 224 is disposed at the intermediate portion between the sheet member 225, to which the first and second fixed terminals 31 and 32 are provided, and the elastic body 222. The sheet member 225 is disposed so as to be supported in a flat manner by the internal wall 200a of the control apparatus 200 and a wired circuit (refer to FIG. 33).

According to the present embodiment, although the various examples of the second control unit 220 are described, the other control units 210, 230, and 240 can be constructed similarly hereto.

Moreover, the first and second embodiments are described by use of the pressure-sensitive device 12 having the characteristics shown in FIG. 4 and FIG. 11. In other words, according to the characteristics, an increase in the pressure to the controller 11 causes the resistance of the pressure-sensitive device 12 to increase and the output voltage to decrease. However, according to the first and second embodiments, it also possible to use a pressure-sensitive device 12 having characteristics which are opposite to the aforementioned ones. That is, according to the opposite characteristics, an increase in the pressure to the controller 11 causes the resistance of the pressure-sensitive device 12 to decrease and the output voltage to increase. By using the pressure-sensitive device 12 having the opposite characteristics, the input characteristics of the level segmenting unit 15 need to be inverted. However, the pressure-sensitive device 12 has characteristics such that a large voltage is not applied unless the controller 11 is pressed.

[Third embodiment]

Next, a detailed description is given of the structure according to a third embodiment of the present invention. Incidentally, the same reference numerals denote the same portions as those of the first embodiment which has already been described, and thus a detailed description thereof is omitted.

Although the control apparatus 200 according to the first embodiment utilizes the pressure-sensitive device 12 as a detecting device, a detecting device according to the third embodiment which will be described, comprises a resistor 40 and a conductive member 50.

Figure 34A:
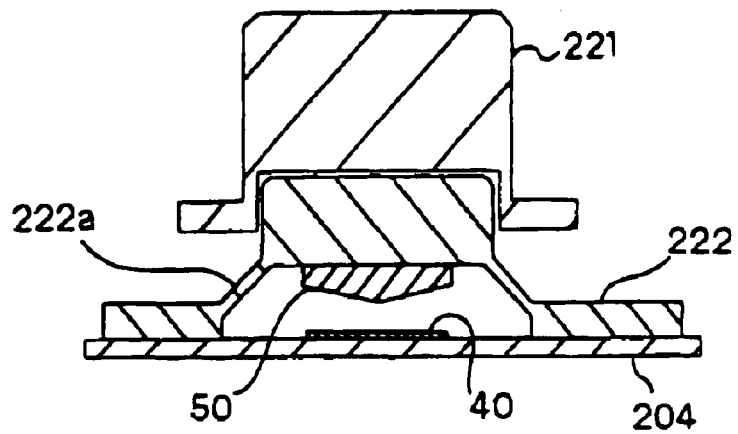
FIG. 34A to FIG. 34C are front sectional views showing one structural example of a second control unit according to a third embodiment of the present invention.
Figure 34B:
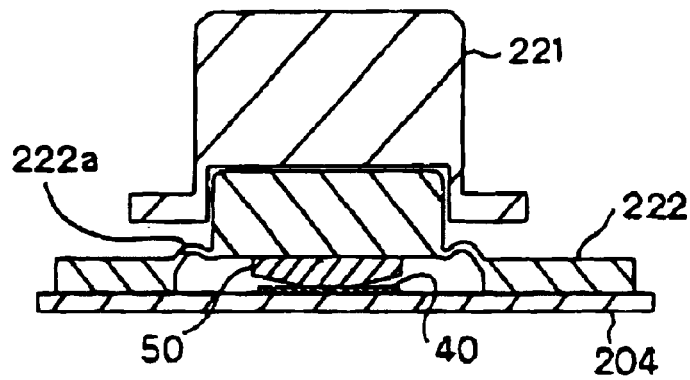
Figure 34C:
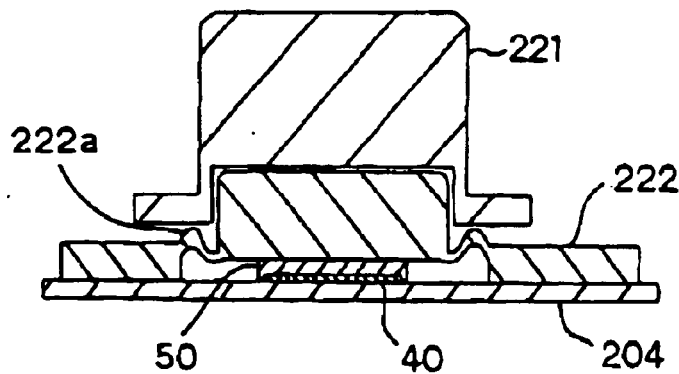

FIG. 34A to FIG. 34C are diagrams showing one structural example of a second control according to the present embodiment. Although only a single control button 221 and the related structure are shown in the figures, a plurality of the control buttons 221 can be provided in the second control unit 220, each having the same structure as the structure shown in the figures if any desired control button 221 is selected.

In other words, the second control unit 220 according to the present embodiment comprises the control button 221 serving as the controller 11, the elastic body 222, the conductive member 50, and the resistor 40. The conductive member 50 is made of, e.g., conductive rubber having elasticity, and is formed with a peak shape in which the top of the peak is at the center. The conductive member 50 is adhered to the inside of the ceiling sure of the elastic portion 222a which is formed in the elastic body 222.

The resistor 40 is provided, for instance, on the internal board 204 so as to face the conductive member 50, and the conductive member 50 makes contact with the resistor 40 in accordance with the pressing operation of the control button 221. The conductive member 50 is deformed in accordance with the pressure on the control button 221 (that is, contact pressure with the resistor 40), thereby changing the contact area with the resistor 40, as shown in FIGS. 34B and 34C. In other words, when the pressure on the control button 221 is small, the portion near the top of the conductive member 50 having a peak shape makes contact with the resistor 40, as shown in FIG. 34B. Further, when the pressure on the control button 221 becomes larger, the conductive member 50 is gradually deformed from the top thereof and the contact area becomes larger.

Figure 35:
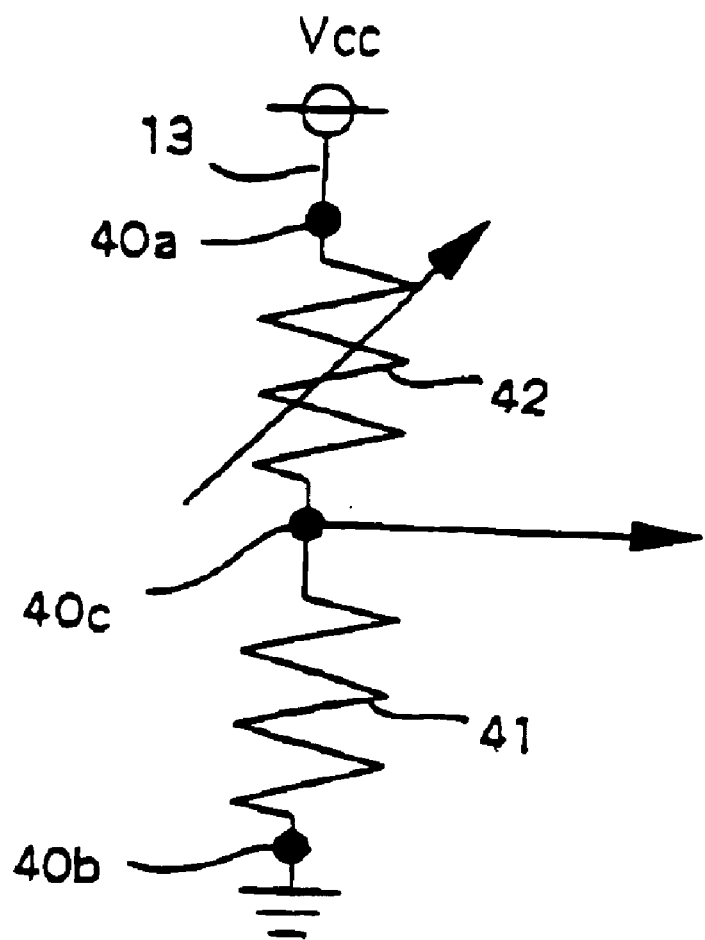
FIG. 35 is a diagram showing the circuit configuration of a resistor shown in FIGS. 34A to 34C.

FIG. 35 is a diagram showing a circuit construction of the resistor 40, the conductive member 50, and devices peripheral thereto. A variable resistor 42 corresponds to the combination of the conductive member 50 and the resistor 40 in FIGS. 34A to 34C. A fixed resistor 41 (not shown in FIGS. 34A to 34C) is connected to the resistor 40. A power supply voltage Vcc is applied to the variable resistor 42 and the fixed resistor 41 which are serially connected, that is, across electrodes 40a and 40b.

The variable resistor 42 corresponds to the combination of the conductive member 50 and the resistor 40. The resistance of the variable resistor 42 changes in accordance with the contact area between the conductive member 50 and the resistor 40. That is, if the conductive member 50 makes contact with the resistor 40, the conductive member 50 functions as a bypass for the resistor 40 and a current flows. Therefore, the contact portion is effectively short-circuited, so that the resistance of the resistor 40 drops. As the contact area of the conductive member 50 becomes larger, the resistance of the resistor 40 is decrease more.

The power supply voltage Vcc applied across the electrodes 40a and 40b is divided by the variable resistor 42 whose resistance changes in accordance with the pressure on the control button 221 and the fixed resistor 41. Thus, the output voltage which is obtained from an output terminal 40c between the variable resistor 42 and the fixed resistor 41 becomes larger as the resistance of the variable resistance 42 becomes smaller and, on the other hand, the output voltage becomes smaller as the resistance of the variable resistance 42 becomes larger.

Figure 36:
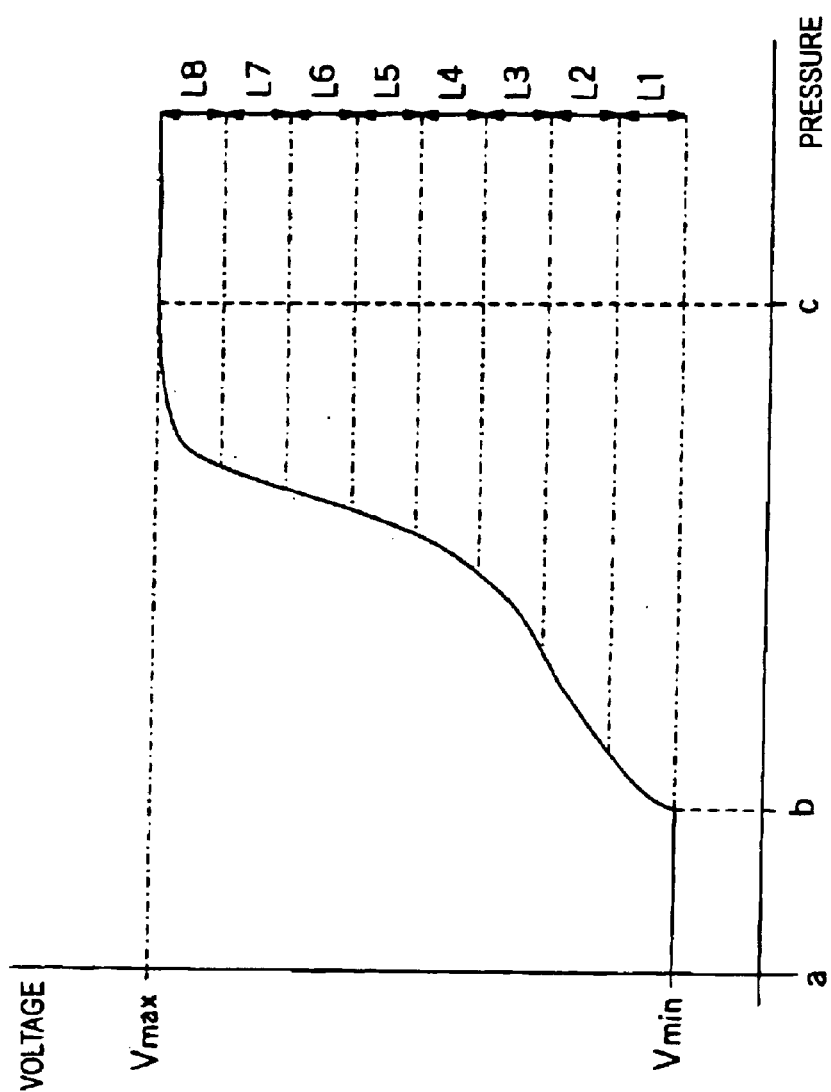
FIG. 36 is a diagram showing characteristics of an analog signal which is outputted by an output terminal of the resistor shown in FIG. 35.

FIG. 36 is a diagram showing the characteristics of the analog signal (voltage) which is outputted from the output terminal 40c of the resistor 40.

To start with, since a voltage is applied to the resistor 40 when the power is turned on, a predetermined analog signal (voltage) Vmin is outputted from the output terminal 40c until the control button 221 is pressed (a position "a" shown in the figure). Subsequently, since the resistance of the resistor 40 is not changed until the conductive member 50 makes contact with the resistor 40 when the control button 221 is pressed, the output from the resistor 40 is held at Vmin and is not changed. Further, the control button 221 is pressed and the conductive member 50 makes contact with the resistor 40 (a pressing position "b" in the figure) and, thereafter, the contact area of the conductive member 50 with the resistor 40 increases in accordance with the pressure on the control button 221. Thus, the internal resistance of the resistor 40 decreases and the analog signal (voltage) which is outputted from the output terminal 40c of the resistor 40 increases. When the conductive member 50 is deformed to the greatest extent, the analog signal (voltage) outputted from the output terminal 40c of the resistor 40 is equal to a maximum value Vmax (a pressed position "c" in the figure).

Figure 37:
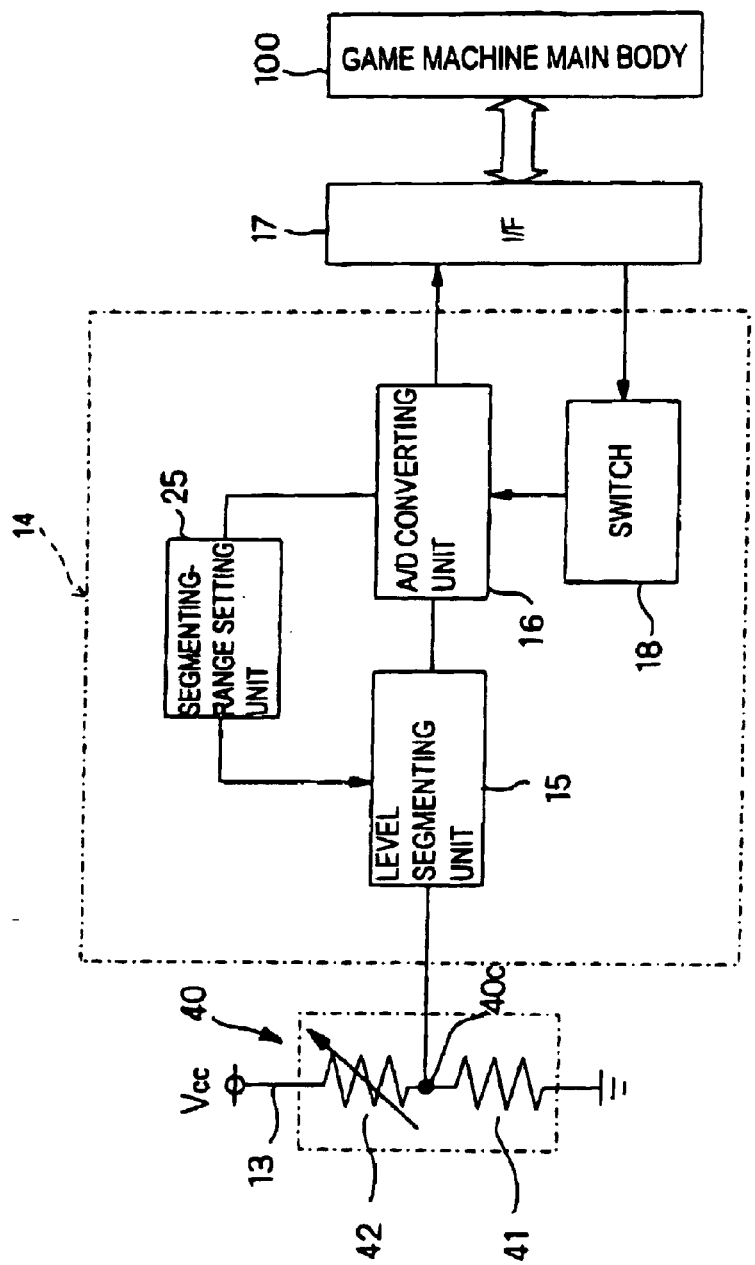
FIG. 37 is a block diagram showing the main portion concerning the second control unit according to the third embodiment.

FIG. 37 is a block diagram showing the main portion of the control apparatus according to the third embodiment of the present invention.

According to the preset embodiment, the MPU 14 provided on the internal board of the control 200 also comprises the level segmenting unit 15, the A/D converting unit 16, and the switch 18. According to the present embodiment, the analog signal (voltage) which is outputted from the output terminal 40c of the resistor 40 is inputted to the level segmenting unit 15, then, the output level of the analog signal is segmented into a plurality of levels by the level segmenting unit 15, and, further, the A/D converting unit 16 converts the analog signal which is outputted by the resistor 40 into a digital signal in accordance with the segmented output level.

The functions of the level segmenting unit 15 and A/D converting unit 16 are the same as those of the aforementioned first embodiment. The level segmenting unit 15 has a fundamental function for segmenting the range of levels of the analog signal (voltage) which is outputted from the resistor 40 by a uniform width, as shown in FIG. 36. The number of segments can be arbitrarily set and, in the example shown in FIG. 36, the range of levels of the analog signal (voltage) is uniformly segmented into eight levels. The individual output levels L1 to L8 which are segmented uniformly as discussed above are transmitted to the A/D converting unit 16. Incidentally, the range of levels of the analog signal which is uniformly segmented by the level segmenting unit 15 can be changed arbitrarily.

The A/D converting unit 16 converts the analog signal level-segmented by the level segmenting unit 1 into the digital signal in accordance with the output level of the analog signal and outputs the digital signal. In other words, the A/D converting unit 16 outputs the digital signal having a plurality of bits in accordance with the output levels L1 to L8.

The A/D converting unit 16 assigns the digital signal having a proper plurality of bits to the output level which is level-segmented and outputs the digital signal. As an example, the digital signal having a plurality of bits, e.g., 8 bits or 16 bits, is assigned to the output level and the digital signals "1f", "3", . . . , "ff" are assigned and outputted in the cases of level 1 (L1), level 2 (L2), . . . , level 8 (L8), respectively.

The digital signal having a plurality of bits which is outputted by the A/D converting unit 16 is transmitted to the game machine main body 100 by way of the interface 17 that is provided to the internal board of the control apparatus 200. The digital signal causes the movement of the game character, etc.

The level change in the analog signal which is outputted from the output terminal 40c of the resistor 40 corresponds to the change in the pressure which is applied by the control button 221 (controller 11). Therefore, the digital signal having the plurality of bits which is outputted by the A/D converting unit 16 corresponds to the pressure on the control button 221 (controller 11) by the user. If the operation of the game character, etc. is controlled by the digital signal having the plurality of bits which has the above-explained relation with the user's pressing operation, it is possible to realize a smoother operation in an analog manner as compared with the control operation by the digital signal having a single bit ("1" or "0").

According to the present embodiment, the A/D converting unit 16 also functions as an output unit for the digital signal having a single bit (i.e., "1" or "0") in accordance with the change in analog signal which is outputted from the output terminal 40c of the resistor 40 and, in response to a switching operation of the switch 18, outputs either the digital signal having the plurality of bits or the digital signal having the single bit.

According to the present embodiment, the switch 18 is also controlled in response to a control signal which is sent from the game machine main body 100 on the basis of the game program which is recorded in the optical disk. That is, if the game program which is recorded in the optical disk is executed, the game machine main body 100 outputs a control signal for instructing the A/D converting unit 16 to function as an output unit for the digital signal having a plurality of bits or a control signal for instructing the A/D converting unit 16 to function as an output unit for the digital signal having a single bit. Based on the control signal, the switch 18 selects and switches the function of the A/D converting unit 16.

According to the function which is selected by the switch 18, the A/D converting unit 16 converts the analog signal outputted from the output terminal 40c of the resistor 40 into the digital signal having a plurality of bits or the digital signal having a single bit and outputs the converted digital-signal. If the function as the output unit for the digital signal having the plurality of bits is selected, the output level which is uniformly segmented by the level segmenting unit 15 as mentioned above is converted into the corresponding digital signal and is outputted to the game machine main body 100.

On the other hand, if the function as the output unit for the digital signal having the single bit is selected, the digital signal having a single bit ("1" or "0") is outputted to the game machine main body 100 in accordance with the change in the analog signal which is outputted from the output terminal 40c of the resistor 40. That is, if it is recognized that the value of the analog signal which is outputted by the output terminal 40c of the resistor 40 is Vmin, the A/D converting unit 16 determines that the control button is not pressed and outputs the digital signal "0". On the contrary, if it is recognized on the basis of the output from the A/D converting unit 16 that the value of the analog signal which is outputted by the output terminal 40c of the resistor 40 is not Vmin, the A/D converting unit 16 determines that the control button was pressed and outputs the digital signal "1".

Then, the switch 18 may be switched by the user's manual operation. For instance, a function for switching the switch 18 is allocated to the analog-selecting switch 252 which is provided in the control apparatus 200 and is manually operated, thereby switching the function of the A/D converting unit 16.

As described above, the level segmenting unit 15 uniformly segments the output level of the analog signal which is outputted by the resistor 40 within a predetermined range. There is a danger that it is impossible to output a digital signal which matches the state of the controller 11 if the predetermined range deviates from the range of levels of the analog signal (voltage) which is actually outputted by the resistor 40.

However, the resistor 40 and the conductive material 50 have individual differences and the power supply voltage also varies. Consequently, the individual control apparatus 200 cause the output range of the analog signal outputted by the resistor 40 to differ.

Then, the control apparatus 200 according to the present embodiment comprises a segmenting-range setting unit 25 for individually setting the range of output levels of the analog signal which is segmented by the level segmenting unit 15 (refer to FIG. 37), and to thereby calibrate the range of levels of the analog signal (voltage) which is segmented by the level segmenting unit 15.

Figure 38:
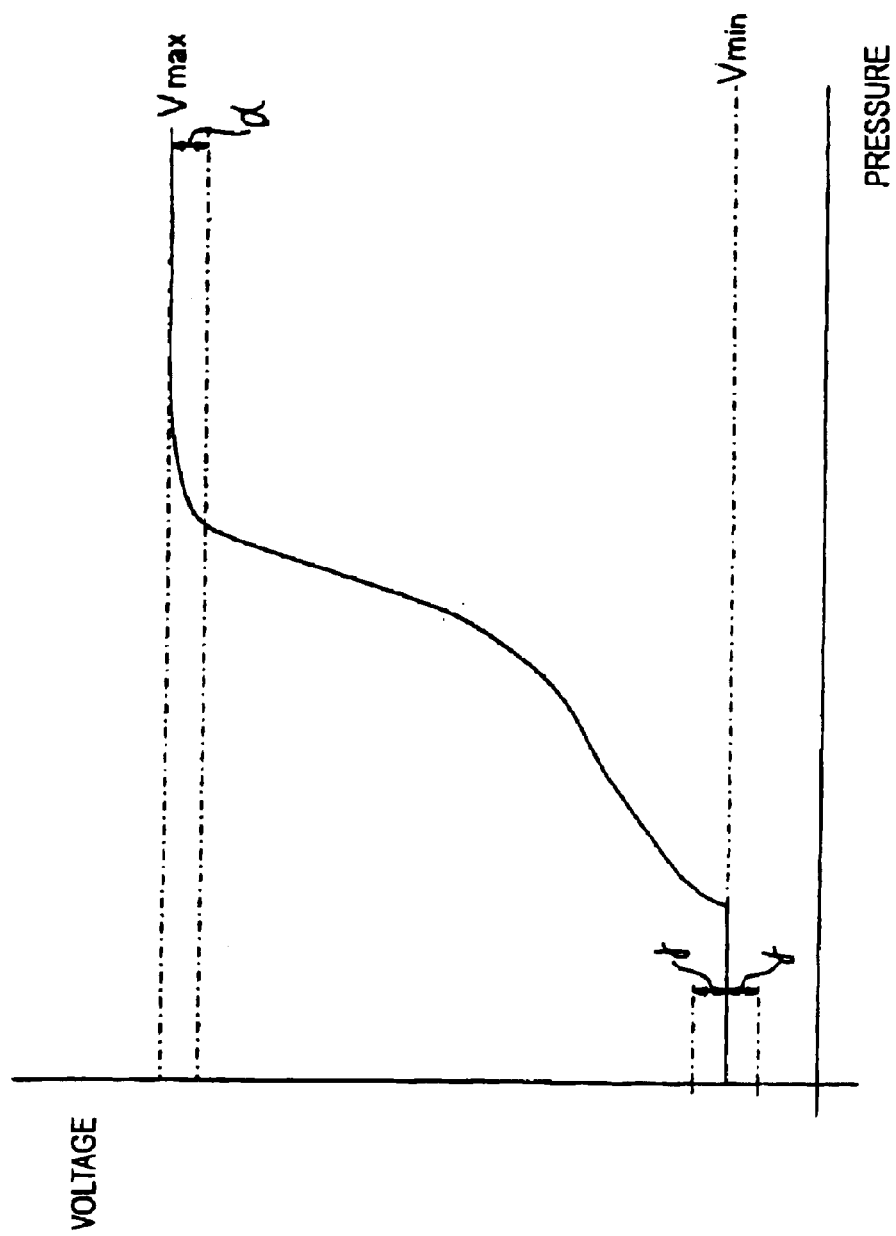
FIG. 38 is a diagram for explaining a function of a segmenting-range setting unit for the second control unit according to the third embodiment.

FIG. 38 is a diagram for explaining the function of the segmenting-range setting unit.

As shown in FIG. 38, a minimum value Vmin and a maximum value Vmax of the analog signal (voltage) which is outputted by the resistor 40 are initially set in advance in the segmenting-range setting unit 25. An arbitrary allowable value a for the maximum value Vmax is set in advance. The allowable value a is set so as to compensate variations when the output (analog signal) of the resistor is recognized on the basis of information from the A/D converting unit 16. Further, a discriminating value γ around the minimum value Vmin is set in advance so as to determine whether or not the control button is pressed.

For the setting, the segmenting range setting unit 25 executes the calibration operation as follows.

When the power supply of the control apparatus 200 is turned on, the segmenting-range setting unit 25 recognizes a level Vmin(Real) of the analog signal (voltage) which is actually outputted by the resistor 40 on the basis of the information from the A/D converting unit 16 in order to adjust the minimum value Vmin of the analog signal (voltage) which is outputted by the resistor 40.

In this case, considering the reason that the user presses the control button 221, etc., it is determined whether or not Vmin(Real) is within, the range of the allowable error value γ in which Vmin is set to a center value. If Vmin(Real) is out of the range (Vmin+γ)>Vmin(Real)>(Vmin−γ), the user is informed that the calibration is being performed.

To inform the user, it is possible to adopt methods of switching on/off the display unit 253 which is provided in the control apparatus 200 and operating a vibration mechanism if such a mechanism built in the control apparatus 200, etc.

Next, under the condition such that Vmin(Real) is within the range (Vmin+γ)>Vmin(Real)>(Vmin−γ), the value Vmin(Real) is compared with Vmin. As a comparison, if Vmin(Real)>Vmin, the initial set value Vmin is set as the minimum value of the analog signal (voltage) which is outputted by the resistor 40. If Vmin(Real)<Vmin, the actual output value Vmin(Real) is changed and set as the minimum value of the analog signal (voltage) which is outputted by the resistor 40.

Sequentially, the control button 221 is depressed strongly by the user according to the manual operation, etc. thereby recognizing a level Vmax(Real) of the analog signal (voltage) which is actually outputted by the resistor 40 on the basis of the information that is then outputted from the A/D converting unit 16.

If the value Vmax(Real) is larger than (Vmax−α) which is obtained by considering the allowable value a, it is recognized that the user pressed the control button 221 up to the limit and Vmax(Real) is compared with Vmax. As a comparison, Vmax(Real)<Vmax, the initial set value Vmax is set as the maximum value of the analog signal (voltage) which is outputted by the resistor 40. On the other hand, if Vmax(Real)>Vmax, the actual output value Vmax(Real) is changed and set as the maximum value of the analog signal (voltage) which is outputted by the resistor 40.

The segmenting range setting unit 25 controls the level segmenting unit 15 so as to uniformly segment the analog signal (voltage) which is outputted by the resistor 40 within the range from the minimum value Vmin to the maximum value Vmax, which are set as mentioned above.

Figure 39A:
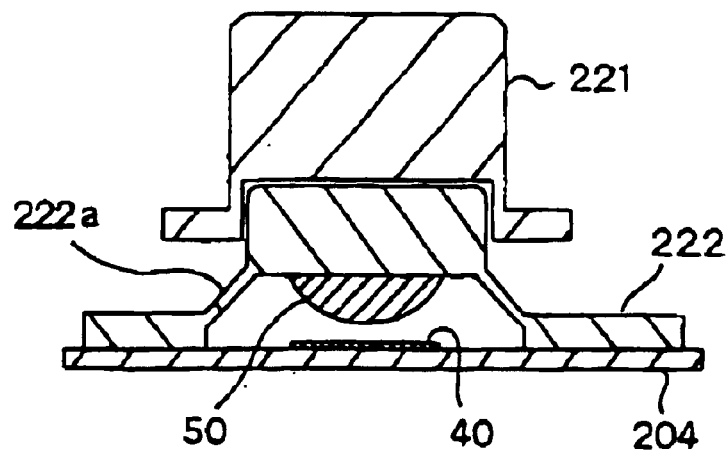
FIG. 39A and FIG. 39B are front sectional views showing a deformed example of a conductive member which forms a part of a detecting device according to the third embodiment of the present invention.
Figure 39B:
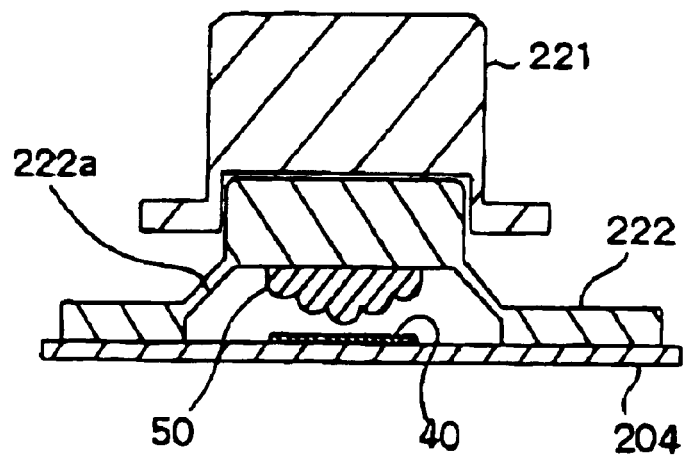

FIG. 39A and FIG. 39B are diagrams showing deformed examples of the conductive member.

The conductive member 50 may have a shape in which the contact area with the resistor 40 can change in accordance with the contact pressure to the resistor 40, and is not limited to the peak-like shape shown in FIGS. 34A to 34C. For example, the conductive member 50 can have a spherical shape shown in FIG. 39A or a shape having a plurality of projections whose heights are different as shown in FIG. 39B.

Figure 40:
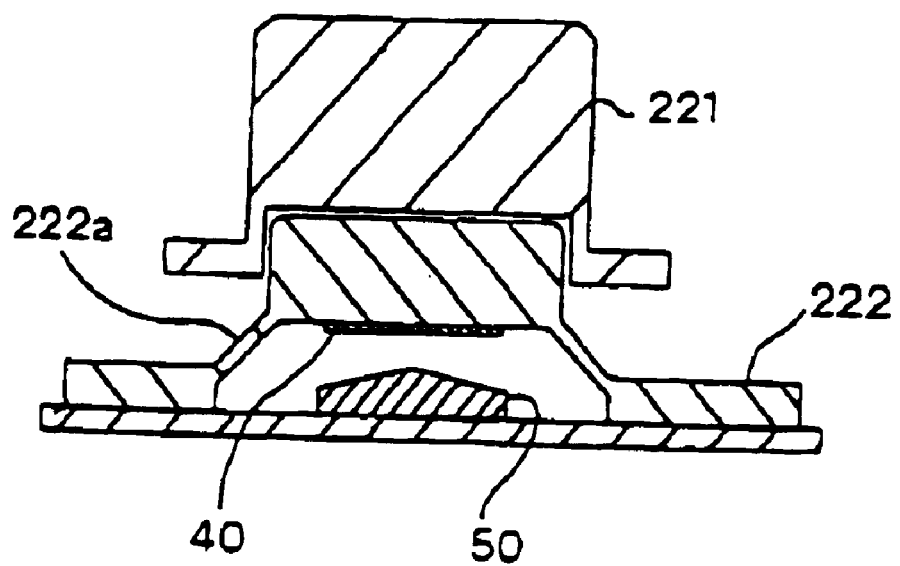
FIG. 40 is a front sectional view showing another structural example of the second control unit according to the third embodiment of the present invention.

As shown in FIG. 40, the resistor 40 can be adhered to the inside of the ceiling surface of the elastic portion 222a which is formed in the elastic body 222 and can be disposed so as to face the conductive members 50.

Figure 41:
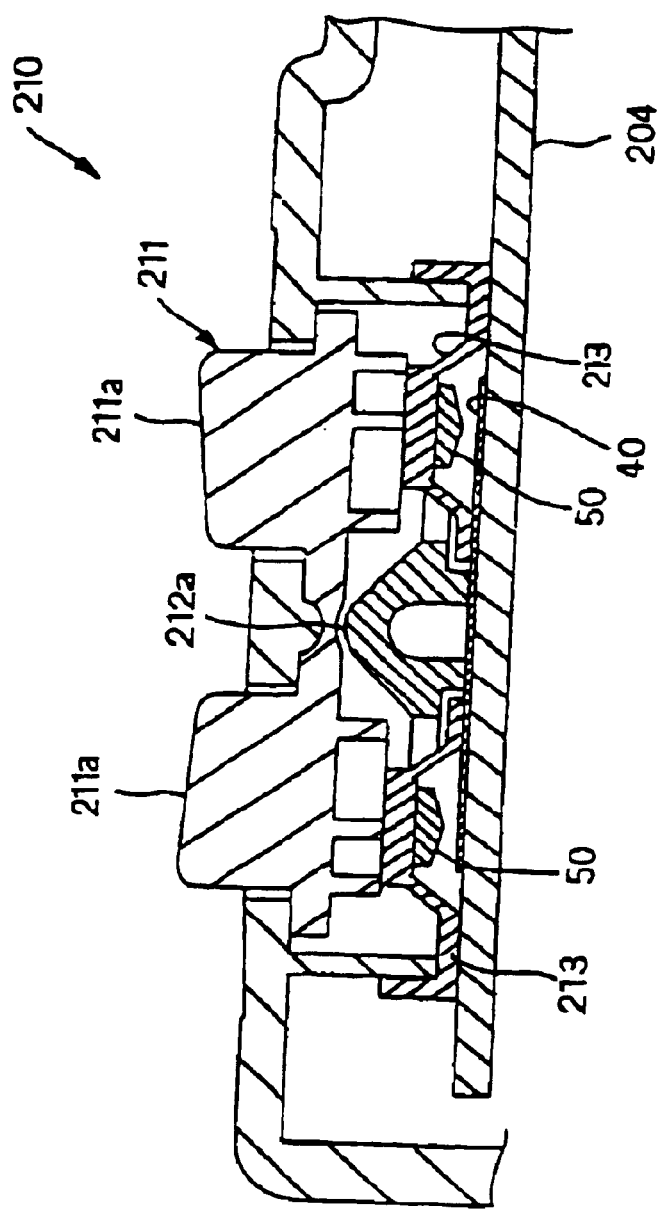
FIG. 41 is a front sectional view showing a structural example of a first control unit according to the third embodiment of the present invention.

FIG. 41 is a diagram showing a structural example of the first control unit according to the present embodiment.

According to the sequel example shown in the figure, the conductive members 50 are adhered to the inside of ceiling surface of the elastic body 213, corresponding to the control keys 211a (controller 11) of the cross-shaped control body 211. The resistor 40 having the single structure is disposed so as to face the conductive members 50.

Figure 42:
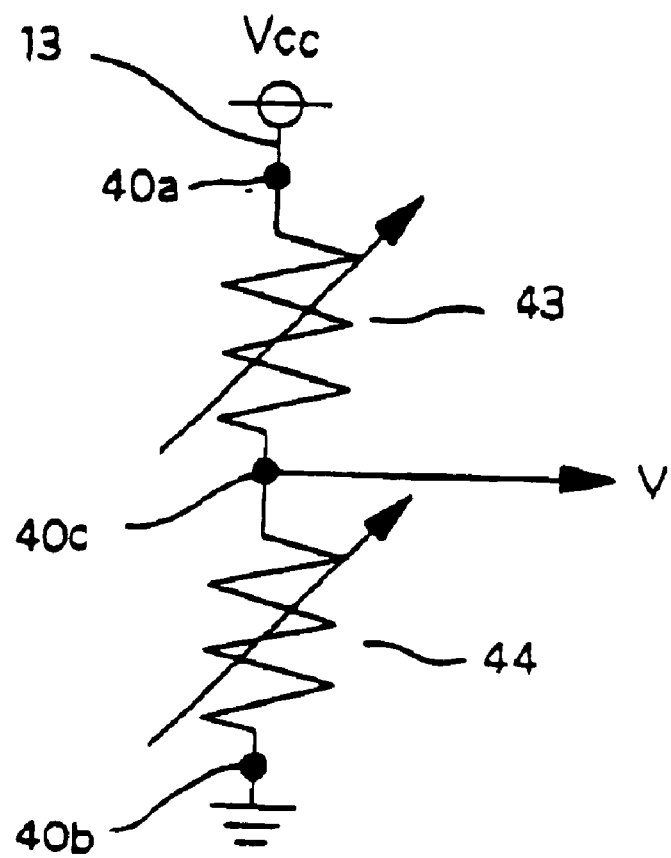
FIG. 42 is a diagram showing the circuit configuration of a resistor shown in FIG. 41.

FIG. 42 is a diagram showing a circuit construction of the resistor. As shown in the figure, the resistor 40 is inserted in series with the power line 13 and a voltage is applied across the electrodes 40a and 40b. The internal resistance of the resistor 40 is schematically divided into first and second variable resistors 43 and 44 shown in the figure. For instance, the conductive member 50 which moves together with the control key 211a (up directional key) for moving the character upward makes contact with a portion of first variable resistor 43 and the conductive member 50 which moves together with the control key 211a (left directional key) for moving to the left makes contact therewith, thereby changing the resistance in accordance with the contact area with the conductive members 50. For instance, the conductive member 50 which moves together with the control key 211a (down directional key) for moving the character downward makes contact with the second variable resistor 44 and the conductive member 50 which moves together with the control key 211a (right directional key) for moving to the right makes contact therewith, thereby changing the resistance in accordance with the contact area with the conductive members 50.

The output terminal 40c is provided at an intermediate portion between the variable resistors 43 and 44, and the analog signal is outputted from the output terminal 40c in accordance with the pressure on the control keys 211a (controller 11).

The outputs from the output terminal 40c can be calculated by using a dividing ratio of the resistances of the first and second variable resistors 43 and 44. If the resistance of the first variable resistor 43 is R1, the resistance of the second resistor 44 is R2, and the power supply voltage is Vcc, an output voltage V generated at the output terminal 40c can be expressed by the following expression.

$$V = Vcc \times R2/(R1+R2)$$

Therefore, when the resistance of the first variable resistor 43 decreases, the output voltage increases. On the other hand, when the resistance of the second variable resistor 44 decreases, the output voltage decreases.

Figure 43:
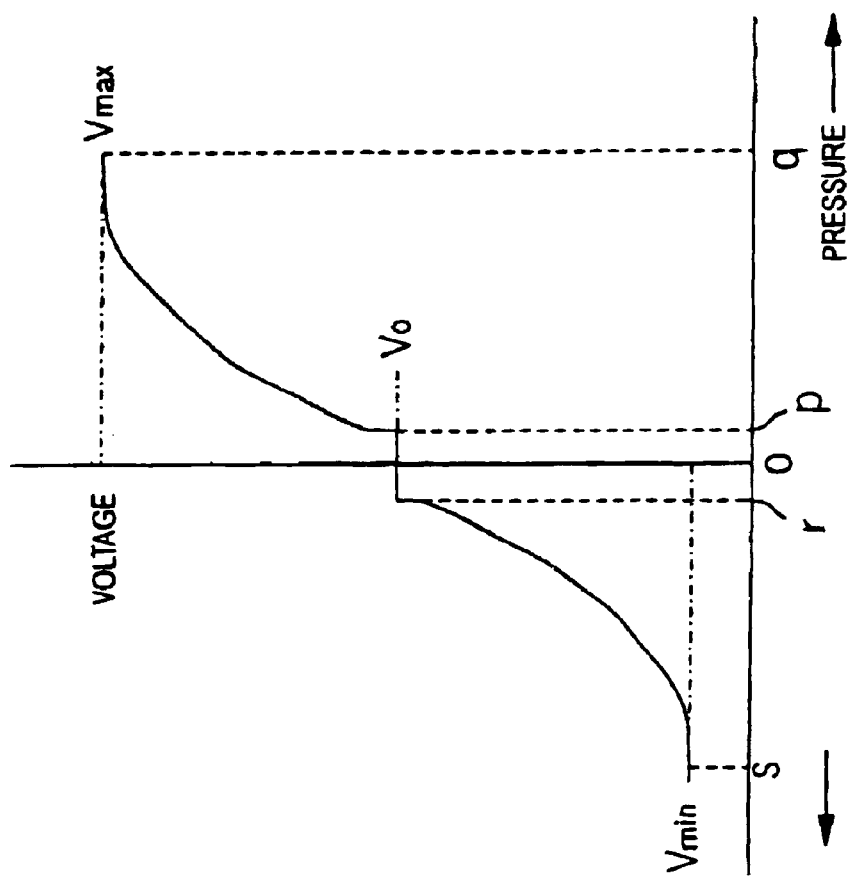
FIG. 43 is a diagram showing characteristics of an analog signal which is outputted by an output terminal of the resistor shown in FIG. 42.

FIG. 43 is a diagram showing the characteristics of the analog signal (voltage) which is outputted by the output terminal 40c of the resistor.

First of all, a voltage is applied to the resistor 40 when the power is turned on, so that a predetermined analog-signal (voltage) $V_0$ is outputted by the output terminal 40c unless the control keys 211a of the controller 221 are pressed.

Next, if any one of control keys 211a is pressed, the output from the resistor 40 is kept at $V_0$ and does not change because the resistance of the resistor 40 does not change util the conductive member 50 makes contact with the resistor 40.

Moreover, the up directional key or the left directional key is pressed and the conductive member 50 makes contact with the first variable resistor 43 in the resistor 40 (a pressed position p in the figure) and, thereafter, the contact area of the conductive member 50 for the first variable resistor 43 increases corresponding to the pressure on the control key 211a (controller). Thus, the resistance corresponding to the position decrease and the analog signal (voltage) which is outputted by the output terminal 40c in the resistor 40 is increased. When the conductive member 50 is deformed to the greatest extent, the analog signal (voltage) which is outputted by the output terminal 40c in the resistor 40 is set to the maximum value Vmax (a pressed position q in the figure).

On the contrary, the down directional key or right directional key is pressed and the conductive member 50 makes contact with the second variable resistor 44 in the resistor 40 (a pressed position r in the figure) and, thereafter the contact area of the conductive member 50 for the second variable resistor 44 increases corresponding to the pressure on the control key 211a (controller). Thus, the resistance corresponding to the position decreases and this results in decreasing the analog signal (voltage) which is outputted by the output terminal 40c in the resistor 40. When the conductive member 50 is deformed to the greatest extent, the analog signal (voltage) which is outputted by the output terminal 40c in the resistor 40 is set to the minimum value Vmin (a pressed position s in the figure).

Figure 44:
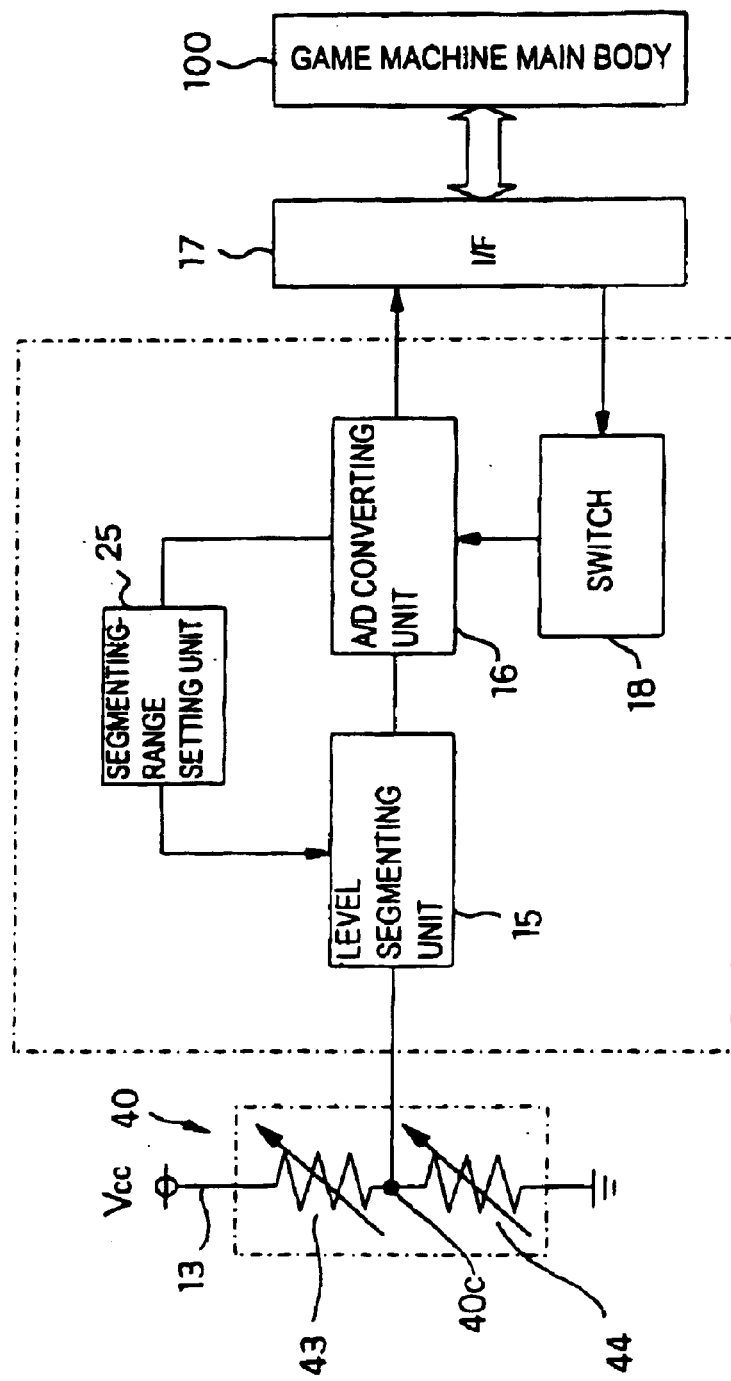
FIG. 44 is a block diagram showing the main portion concerning first control unit according to the third embodiment.

The analog signal (voltage) which is outputted by the output terminal 40c in the resistor 40 is inputted to the level segmenting unit 15, as shown in FIG. 44. The level segmenting unit 15 segments the output level of the analog signal into a plurality of levels and, further, the A/D converting unit 16 converts the analog signal which is outputted by the resistor 40 into the digital signal in accordance with the segmented output-level. Incidentally, the functions of the level segmenting unit 15, the A/D converting unit 16, and the switch 18 which are shown in FIG. 44 have been described above with reference to FIG. 37, and the detailed description thereof is omitted.

Figure 45:
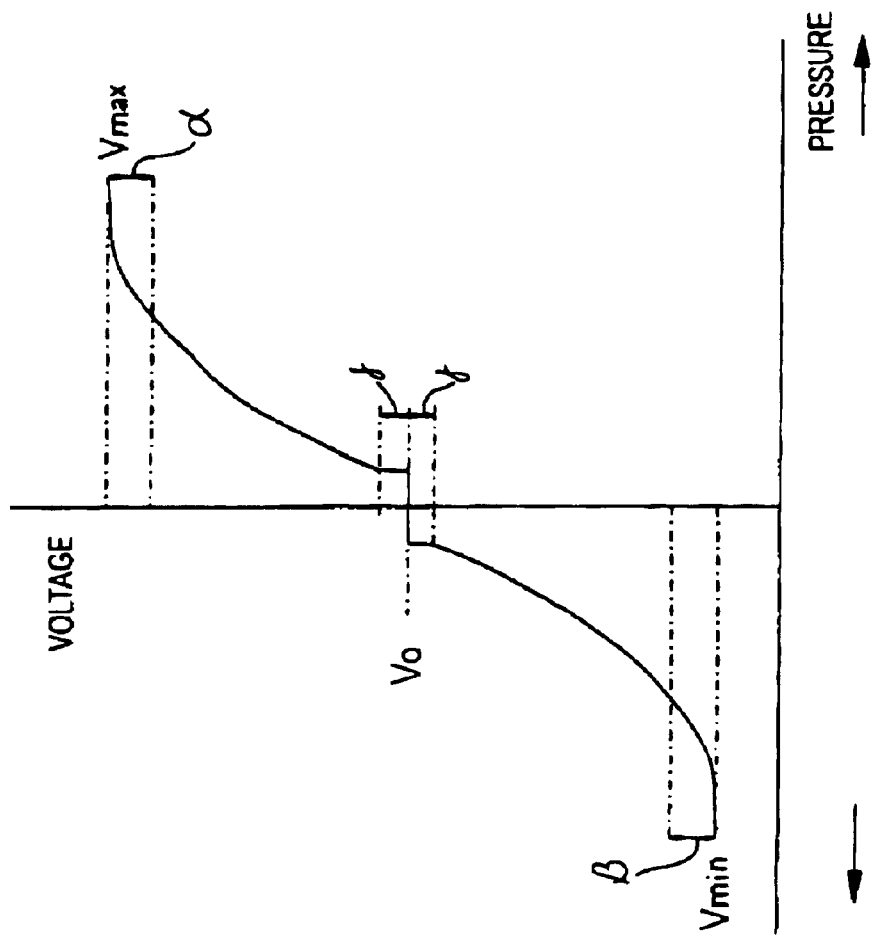
FIG. 45 is a diagram for explaining the function of a segmenting-range setting unit for the first control unit according to the third embodiment.

The value $V_0$ during the non-pressed state and the minimum value Vmin and the maximum Vmax of the analog signal (voltage) which is outputted by the resistor 40 are initially set, in advance, in the segmenting-range setting unit 25 for individually setting the range of output levels of the analog signal which is segmented by the level segmenting unit 15, as shown in FIG. 45. An arbitrary allowable value α for the maximum value Vmax is preset and an arbitrary allowable value β for the minimum value Vmin is preset. The allowable values α and β compensate for variations when the output (analog signal) of the resistance is recognized on the basis of the information from the A/D converting unit 16. Further, a discriminating value γ around the value $V_0$ of the analog signal (voltage) which is outputted in the non-pressed state is preset so as to determine whether or not the control button is pressed.

For the setting, the segmenting-range setting unit 25 executes the calibration operation as follows.

When the power supply of the control apparatus 200 is turned on, the segmenting range setting unit 25 first recognizes, on the basis of information from the A/D converting unit 16 in order to adjust the level $V_0$ of the analog signal (voltage) which is outputted by the resistor 40 in the non-pressed state, a level $V_0$(Real) of the analog signal (voltage) which is actually outputted by the resistor 40.

In this case, considering the reason that the user presses the control button 221, etc., it is determined whether or not $V_0$(Real) is within the range of the allowable error value γ in which $V_0$ is set as a central value. If $V_0$(Real) is out of a range $(V_0+\gamma) > V_0(\text{Real}) > (V_0-\gamma)$, the user is informed that the calibration is being performed.

To the user, it is possible to adopt methods of switching on/off the display unit 253 provided in the control apparatus 200 and operating a vibration mechanism if such a mechanism is built in the control apparatus 200, etc.

Next under the condition such that $V_0$(Real) is within the range $(V_0+\gamma) > V_0(\text{Real}) > (V_0-\gamma)$, the value $V_0$(Real) is compared with $V_0$. As a comparison if $V_0(\text{Real}) > V_0$, the initial set value $V_0$ is set as the value of the analog signal (voltage) which is outputted by the resistor 40 in the non-pressed state. On the other hand, if $V_0(\text{Real}) < V_0$, the actual output-value $V_0$(Real) is changed and set as the value of the analog signal (voltage) which is outputted by the resistor 40 in the non-pressed state.

Sequentially, the upper-directional key is depressed strongly by a manual operation of the user, etc, thereby recognizing the level Vmax(Real) of the analog signal (voltage) which is actually outputted by the resistor 40 on the basis of information that is then outputted from the A/D converting unit 16.

If the value Vmax(Real) is larger than (Vmax−α) which is obtained by considering the allowable value a, it is recognized that the user pressed the up directional key up to the limit and Vmax(Real) is compared with Vmax. As a comparison, Vmax(Real)<Vmax, the initial set value Vmax is set as the maximum value of the analog signal (voltage) which is outputted by the resistor 40. On the other hand, if Vmax(Real)>Vmax, the actual output value Vmax(Real) is changed and set as the maximum value of the analog signal (voltage) which is outputted by the resistor 40.

The similar operation is performed in the case of the left directional key. The maximum value Vmax of the analog signal (voltage) which is outputted by the resistor 40 in accordance with the operation for pressing the left directional key is set.

Sequentially, the down directional key is depressed strongly by a manual operation of the user, etc, thereby recognizing the level Vmin(Real) of the analog signal (voltage) which is actually outputted by the resistor 40 on the basis of information that is then outputted by the A/D converting unit 16.

If the value Vmin(Real) is smaller than (Vmin+β) which is obtained by considering the allowable value β, it is recognized that the user pressed the down directional key up to the limit and Vmin(Real) is compared with Vmin. As a comparison, if Vmin(Real)>Vmin, the initial set value Vmin is set as the minimum value of the analog signal (voltage) which is outputted by the resistor 40. On the other hand, if Vmin(Real)<Vmin, the actual output value Vmin(Real) is changed and set as the minimum value of the analog signal (voltage) which is outputted by the resistor 40.

The similar operation is performed in the case of the right directional key. The minimum value Vmin of the analog signal (voltage) which is outputted by the resistor 40 in accordance with the operation for pressing the right directional key is set.

The segmenting-range setting unit 25 controls the level segmenting unit 15 so as to uniformly segment the analog signal (voltage) which is outputted by the resistor 40 within the range from the output $V_0$ in the non-pressed state to the maximum value Vmax, which are set as mentioned above, in response to the pressing operation of the up directional key and the left directional key. The segmenting-range setting unit 25 controls the level segmenting unit 15 so as to uniformly segment the analog signal (voltage) which is outputted by the resistor 40 within the range from the output $V_0$ in the non-pressed state to the minimum value Vmin, which are set as mentioned above, in response to the pressing operation of the down directional key and the right directional key.

Incidentally, in the above description, the up directional key and the left directional key are assigned to the first variable resistor portion in the resistor 40 and the down directional key and the right directional key are assigned to the second variable resistor portion in the resistor 40. However, the present invention is not limited to the above description and, obviously, it is possible to arbitrarily set the allocation between the keys and the variable resistor portions.

With respect to the first control unit 210, the resistor 40 can also be individually arranged at the conductive members 50 which are provided at positions corresponding to the control keys 221a of the control body 211, so as to have the circuit construction shown in FIG. 35. In this case, the characteristics of the analog signal (voltage) which is outputted by the output terminal 40c in the resistor 40 are those shown in FIG. 36.

Furthermore, the present invention is not limited to the above-described embodiments.

The control apparatus according to the present invention is not limited to being applied to the control apparatus 200 for the video game machine shown in FIG. 2. It is possible to apply the control apparatus according to the present invention, for instance, to various control apparatus in which the function can be improved by enabling digital operation and analog operation.

As mentioned above, according to the present invention, the analog signal corresponding to the pressing operation of the controller is converted into the digital signal and the converted digital signal is outputted. Therefore, it is possible to realize digital operation by the controller for pressing operation and also to output the digital signal by the uniform level segmentation without individual differences of the detecting devices and variations in the voltage which is applied to the detecting devices, etc.

What is claimed is:

1. A control apparatus, comprising:
 a controller which can be pressed and operated;
 a detecting device for outputting an analog signal corresponding to the pressing operation of said controller;
 a level segmenting unit for segmenting the analog signal output by said detecting device into one of a plurality of levels;
 an A/D converting unit for converting the segmented analog signal into a digital signal in accordance with the one of the plurality of levels; and
 a segmenting-range setting unit coupled to said level segmenting unit for calibrating a range associated with the plurality of levels into which the analog signal is segmented by said level segmenting unit, the range changing is response to the pressing operation of said controller.

2. An apparatus according to claim 1, further comprising a switch for providing the digital signal with a plurality of bits or a single bit, said switch being connected to said A/D converting unit.

3. An apparatus according to claim 1, wherein
 said segmenting-range setting unit comprises a storing unit, and
 the plurality of levels are stored in said storing unit.

4. An apparatus according to claim 3, wherein said controller is pressed and operated by a pressure which is preset and an output level of the analog sigal which is output by said detecting device during the pressing operation of said controller is stored in said storing unit.

5. An apparatus according to claim 1, wherein
 said segmenting-range setting unit is a volume device that is inserted in a power line to which said detecting device is connected for use in determining the range of output levels.

6. An apparatus according to claim 5, wherein the segmenting range setting unit adjusts the plurality of levels in response to detecting a change in the range of output levels.

7. An apparatus according to claim 1, wherein said segmenting-range setting unit comprises:
 a volume device that is inserted in a power line to which said detecting device is connected for providing a first voltage level;

a storing unit for storing a limit value of the range of the output levels of the analog signal; and a comparator for comparing the first voltage level with the limit value;

wherein said comparator outputs the range of output levels to said level segmenting unit when the first voltage level is within the limit value, and outputs the limit value to said level segmenting unit when the first voltage level is over said limit value.

8. An apparatus according to claim 1, further comprising a projection which is formed at a bottom of said controller, and an elastic body having a concave portion which engages with and supports said projection, wherein said detecting device is pressed due to deformation of said elastic body.

9. An apparatus according to claim 1, further comprising a first flat surface which is formed at a bottom of said controller, and an elastic body having a second flat surface which engages with and supports said first flat surface, wherein said detecting device is pressed due to deformation of said elastic body.

10. An apparatus according to claim 8 or 9, wherein said detecting device comprises an internal board.

11. An apparatus according to claim 1, further comprising:

a switch;

a digital switch serving as an ON/OFF switch provided in said controller; and a digital signal generating unit for outputting a single bit digital signal, said digital signal generating unit being connected to said digital switch;

wherein said switch provides either the digital signal or the single bit digital signal.

12. An apparatus according to claim 11, further comprising:

an elastic body which engages with and supports a bottom of said controller;

a first sheet member and a second sheet member; and first and second fixed terminals provided in said digital switch which are pressed due to deformation of said elastic body and which are provided on one side of said first sheet member;

wherein said detecting device is provided on one side of said second sheet member at portions corresponding to said first and second fixed terminals.

13. An apparatus according to claim 12 wherein said second sheet member is an internal board.

14. An apparatus according to claim 11, further comprising:

an elastic body which engages with and supports a bottom of said controller; and first and second fixed terminals provided in said digital switch which are pressed due to deformation of said elastic body and which are provided on one side of said sheet member;

wherein said detecting device is provided on the other side of said sheet member at portions corresponding to said first and second fixed terminals.

15. An apparatus, comprising:

a controller including:

an actuating member which can be pressed and operated;

a detecting device for outputting an analog signal corresponding to the pressing operation of said actuating member;

a level segmenting unit for segmenting the analog signal output by said detecting device into one of a plurality of levels;

an A/D converting unit for converting the segmented analog signal into a digital signal in accordance with the one of the plurality of levels; and a segmenting-range setting unit for calibrating the range over which said level segmenting unit segments the analog output signal into one of the plurality of levels in response to the pressing operation; and an entertainment device having a storing unit for storing the plurality of levels.

16. A method for adjusting a signal output of a control apparatus having a pressure sensitive device, the method comprising:

detecting an analog signal corresponding to a load exerted on the pressure sensitive device;

establishing a range between an upper signal level and a lower signal level of the detected analog signal;

calibrating the range in response to the load exerted on the pressure sensitive device; and segmenting the detected analog signal into a plurality of signal levels within the calibrated range, whereby the signal output of the control apparatus is adjusted.

17. The method of claim 16, further comprising storing the detected analog signal in a memory storing unit.

18. The method of claim 17, wherein the storing step includes storing the detected analog signal in a detachable memory card.

* * * * *

UNITED STATES PATENT AND TRADEMARK OFFICE
CERTIFICATE OF CORRECTION

PATENT NO. : 6,885,364 B1
DATED : April 26, 2005
INVENTOR(S) : Hiroki Ogata et al.

It is certified that error appears in the above-identified patent and that said Letters Patent is hereby corrected as shown below:

Column 4,
Line 28, delete "fir", and insert -- first --.

Column 9,
Line 22, delete "users", and insert -- user's --.

Column 10,
Line 42, delete "use", and insert -- user --.
Line 65, delete "users", and insert -- user's --.

Column 16,
Line 16, delete "fag", and insert -- first --.
Line 66, delete "end", and insert -- and --.

Column 17,
Line 30, after "221", insert -- is --.

Column 19,
Line 13, delete "decrease", and insert -- decreased --.

Column 20,
Line 22, delete "3", and insert -- 3E --.

Column 21,
Line 56, after "value" delete "a", and insert -- or --.

Column 22,
Line 6, after "within", delete ",".
Line 12, after "mechanism", insert -- is --.
Line 30, after "value" delete "a", and insert -- or --.
Line 60, delete "sequel", and insert -- structural --.

Column 23,
Line 48, delete "util" and insert -- until --.

Column 25,
Line 8, after "value" delete "a" and insert -- $\alpha$ --.

UNITED STATES PATENT AND TRADEMARK OFFICE
CERTIFICATE OF CORRECTION

PATENT NO. : 6,885,364 B1
DATED : April 26, 2005
INVENTOR(S) : Hiroki Ogata et al.

It is certified that error appears in the above-identified patent and that said Letters Patent is hereby corrected as shown below:

Column 26,
Line 40, delete "is" and insert -- in --.

Signed and Sealed this

Fourteenth Day of February, 2006

JON W. DUDAS
*Director of the United States Patent and Trademark Office*